(12) United States Patent
Kadri et al.

(10) Patent No.: US 9,693,164 B1
(45) Date of Patent: Jun. 27, 2017

(54) DETERMINING DIRECTION OF NETWORKED MICROPHONE DEVICE RELATIVE TO AUDIO PLAYBACK DEVICE

(71) Applicant: Sonos, Inc., Santa Barbara, CA (US)

(72) Inventors: Romi Kadri, Cambridge, MA (US); Dayn Wilberding, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 15/229,855

(22) Filed: Aug. 5, 2016

(51) Int. Cl.
*H04R 29/00* (2006.01)
*G06F 3/16* (2006.01)

(52) U.S. Cl.
CPC .......... *H04R 29/007* (2013.01); *G06F 3/162* (2013.01); *H04R 2227/005* (2013.01); *H04R 2420/07* (2013.01); *H04R 2430/20* (2013.01)

(58) Field of Classification Search
CPC ............ H04R 29/007; H04R 2227/005; H04R 2420/07; H04R 230/20; G06F 3/162
USPC .......................................................... 381/58
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |

(Continued)

FOREIGN PATENT DOCUMENTS

| | | |
|---|---|---|
| CN | 102707261 A | 10/2012 |
| EP | 1389853 A1 | 2/2004 |

(Continued)

OTHER PUBLICATIONS

US 9,299,346, 03/2016, Hart et al. (withdrawn)

(Continued)

*Primary Examiner* — Paul S Kim
*Assistant Examiner* — Sabrina Diaz
(74) *Attorney, Agent, or Firm* — McDonnell Boehnen Hulbert & Berghoff LLP

(57) ABSTRACT

Example techniques involve determining a direction of an NMD. An example implementation includes causing two audio drivers to output audio content, where the audio drivers are positioned at a known distance apart in a given azimuthal plane and recording the audio content output by the two audio drivers. The implementation also includes causing a processing device to identify a direction of the NMD relative to a center point of the two audio drivers in the given azimuthal plane. Identifying the direction of the NMD may involve determining a range of possible azimuthal angles between the NMD and the center point, the range of possible angles dependent upon the known distance between the two audio drivers and a phase offset between the two audio drivers indicated by the recorded audio content output. The implementation further includes causing a playback device to adjust calibration based on the identified direction of the NMD.

20 Claims, 13 Drawing Sheets

(56) References Cited

U.S. PATENT DOCUMENTS

| | | |
|---|---|---|
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 8,803,988 B2 | 8/2014 | Lee et al. |
| 8,938,394 B1 | 1/2015 | Faaborg et al. |
| 8,983,844 B1 | 3/2015 | Thomas et al. |
| 9,215,545 B2 | 12/2015 | Dublin et al. |
| 9,288,597 B2 | 3/2016 | Carlsson et al. |
| 9,300,266 B2 | 3/2016 | Grokop |
| 9,318,107 B1 | 4/2016 | Sharifi |
| 9,319,816 B1 | 4/2016 | Narayanan |
| 9,431,021 B1 | 8/2016 | Scalise et al. |
| 9,443,527 B1 | 9/2016 | Watanabe et al. |
| 9,472,201 B1 | 10/2016 | Sleator |
| 9,472,203 B1 | 10/2016 | Ayrapetian et al. |
| 9,489,948 B1 | 11/2016 | Chu et al. |
| 9,494,683 B1 | 11/2016 | Sadek |
| 9,509,269 B1 | 11/2016 | Rosenberg |
| 9,514,752 B2 | 12/2016 | Sharifi |
| 9,536,541 B2 | 1/2017 | Chen et al. |
| 9,552,816 B2 | 1/2017 | Vanlund et al. |
| 9,560,441 B1 | 1/2017 | Mcdonough, Jr. et al. |
| 9,601,116 B2 | 3/2017 | Casado et al. |
| 9,615,170 B2 | 4/2017 | Kirsch et al. |
| 9,615,171 B1 | 4/2017 | O'Neill et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2011/0280422 A1 | 11/2011 | Neumeyer et al. |
| 2014/0075306 A1 | 3/2014 | Rega |
| 2015/0154976 A1 | 6/2015 | Mutagi |
| 2015/0280676 A1 | 10/2015 | Holman et al. |
| 2015/0341406 A1 | 11/2015 | Rockefeller et al. |
| 2015/0363061 A1 | 12/2015 | De Nigris, III et al. |
| 2015/0363401 A1 | 12/2015 | Chen et al. |
| 2016/0007116 A1 | 1/2016 | Holman |
| 2016/0021458 A1 | 1/2016 | Johnson et al. |
| 2016/0029142 A1 | 1/2016 | Isaac |
| 2016/0042748 A1 | 2/2016 | Jain et al. |
| 2016/0098393 A1 | 4/2016 | Hebert |
| 2016/0173578 A1 | 6/2016 | Sharma et al. |
| 2016/0239255 A1 | 8/2016 | Chavez et al. |
| 2016/0314782 A1 | 10/2016 | Klimanis |
| 2017/0076720 A1 | 3/2017 | Gopalan et al. |

FOREIGN PATENT DOCUMENTS

| | | |
|---|---|---|
| WO | 0153994 | 7/2001 |
| WO | 03093950 A2 | 11/2003 |
| WO | 2015178950 A1 | 11/2015 |

OTHER PUBLICATIONS

Non-Final Office Action mailed on Dec. 12, 2016, issued in connection with U.S. Appl. No. 15/098,718, filed Apr. 14, 2016, 11 pages.

Non-Final Office Action mailed on Jan. 13, 2017, issued in connection with U.S. Appl. No. 15/098,805, filed Apr. 14, 2016, 11 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

"AudioTron Quick Start Guide, Version 1.0", Voyetra Turtle Beach, Inc., Mar. 2001, 24 pages.

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo" Analog Stereo Jun. 24, 2000 retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play Device Architecture," Jun. 8, 2000; version 1.0; Microsoft Corporation; pp. 1-54.

"Denon 2003-2004 Product Catalog," Denon, 2003-2004, 44 pages.

US 9,693,164 B1

DETERMINING DIRECTION OF NETWORKED MICROPHONE DEVICE RELATIVE TO AUDIO PLAYBACK DEVICE

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
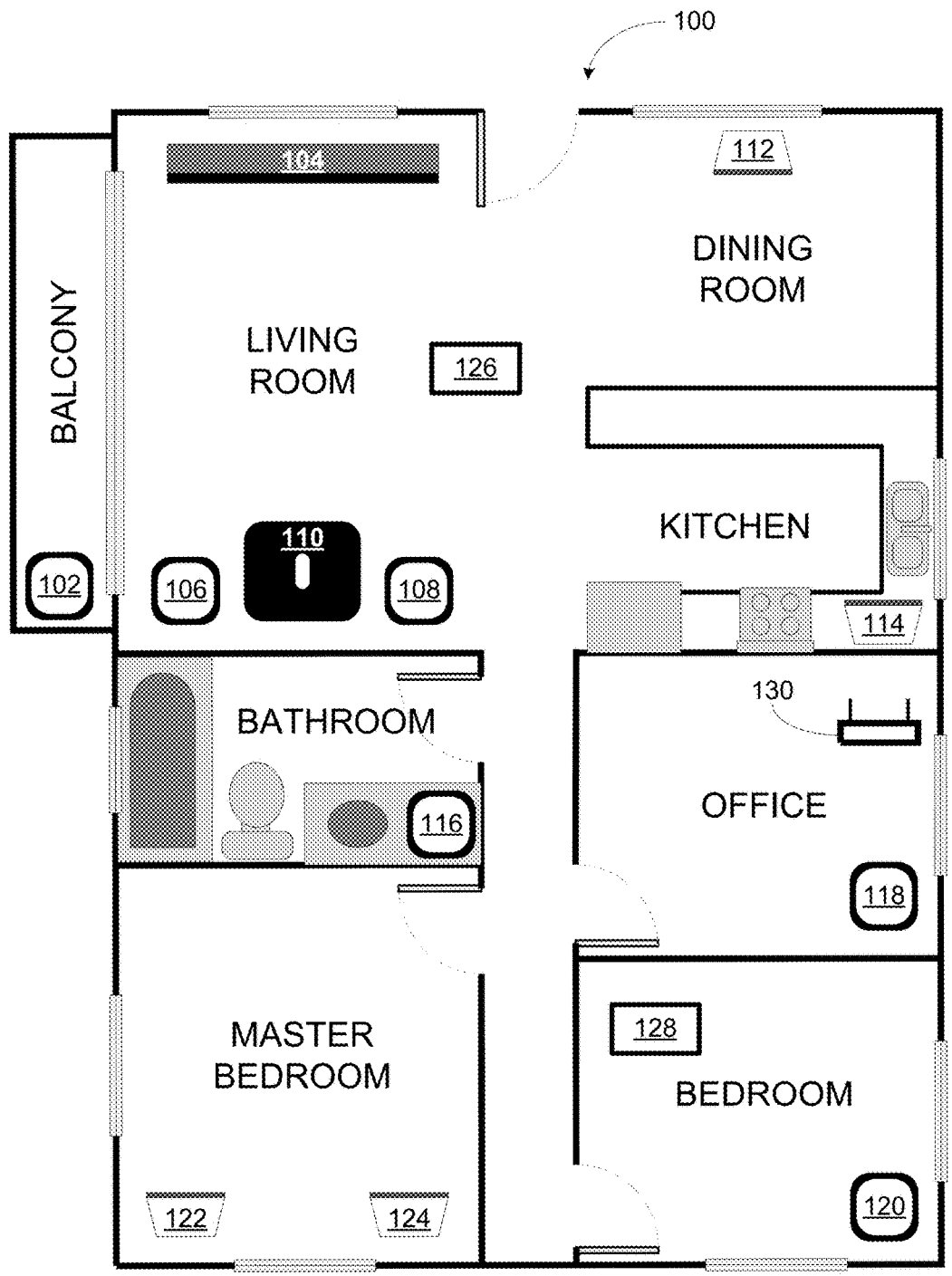
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A networked microphone device (NMD) (e.g., a smartphone, tablet, laptop computer, or other device) may facilitate calibration and/or media playback of an audio playback device. Embodiments described herein involve, inter alia, techniques to determine a direction (i.e., angle) of an NMD. Aspects of the calibration may be performed by taking into account a relative position of the NMD to a playback device.

As one example, during calibration of a playback device, an NMD may record calibration audio that was emitted by the playback device. Before the emitted calibration audio reaches a microphone of the NMD, various portions of the calibration audio are reflected and/or absorbed by the surrounding environment. As such, recordings of the calibration audio indicate characteristics of the environment surrounding the playback device. Based on these recording(s), a processing device (e.g., the NMD itself, or another device) may determine a calibration that adjusts audio output of the playback device according to the surrounding environment. Knowing the position of the NMD relative to the playback device may facilitate and/or improve such a control operation.

As another example, an NMD may facilitate playback by functioning as a control device that controls certain functions of the playback device, perhaps by providing transport controls and/or a media selection interface to control playback on the playback device. Knowing the position of the NMD relative to the playback device may also facilitate and/or improve such a control operation.

Accordingly, example techniques disclosed herein may use recorded audio content that was outputted by two (or more) audio drivers and recorded by an NMD using a microphone. The two or more audio drivers can be housed in a single playback device or in separate playback devices. A possible advantage of present techniques as compared to some other techniques is that the audio content may be recorded with a single microphone. Another possible advantage is that the audio content may be any audio content. In some implementations, calibration audio emitted by a playback device during a calibration procedure may be used. Alternatively, music content outputted during normal media playback may be used. While some implementations may use known content, some implementations may use audio content that is unknown.

Accordingly to an example technique, the two audio drivers are assumed to be positioned at a known distance apart in a given azimuthal plane. For instance, as noted above, two audio drivers may be housed in a single playback device (e.g., a playbar-type device) that includes multiple audio drivers in a horizontal arrangement. Alternatively, the two audio drivers may be housed in separate playback devices (e.g., a stereo pair of playback devices) that are positioned so as to align the respective audio drivers of the separate playback devices in a plane. In some examples, the azimuthal plane of interest (and the alignment of the audio drivers) is horizontal (i.e., parallel to the floor or ground).

However, a vertical plane (or any other direction) can be used provided that two audio drivers are aligned in that plane.

Example techniques may involve some synchronization of audio output between the two audio drivers. Some example techniques described herein assume close synchronization (e.g., in the order of milliseconds of phase offset or better) between the audio drivers. Relatively looser synchronization may yield a less accurate estimate of direction. Some techniques may overcome a lack of close synchronization between the audio drivers by incorporating compensation for a known phase offset.

Given the recorded audio content from a first audio driver and a second audio driver, a processing device may determine the phase offset between respective audio content output from the first audio driver and the second audio driver.

The processing device may use the phase offset between the two audio drivers to determine or estimate the relative distance between each audio driver and the NMD that recorded the audio content. Given these distances, and the known distance between the audio drivers, geometric relationships between the two audio drivers and the NMD can be used to determine a range of possible directions that the NMD can be located relative to any given point along the line between the two audio drivers (e.g., the center of a playback device housing the two audio drivers or the geometric center of two playback devices each housing a respective audio driver).

Example techniques may involve determining position (e.g., direction) of a NMD relative to two audio drivers. A first implementation may include receiving, via a processing device, data representing a recorded audio content that was recorded by a networked microphone device (NMD) upon output of the audio content via a first audio driver and a second audio driver of one or more playback devices, where the first audio driver and the second audio driver are positioned at a known distance apart in a given azimuthal plane. The first implementation may also include identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by second audio driver at the particular point-in-time. The first implementation may further include identifying a direction of the NMD relative to a center point of the first audio driver and second audio driver in the given azimuthal plane. Identifying the direction of the NMD may involve determining a phase offset between the first audio driver and second audio driver and determining a range of possible azimuthal angles between the NMD and the center point, the range of possible angles dependent upon (i) the known distance between the first audio driver and second audio driver and (ii) the determined phase offset between the first audio driver and second audio driver. The first implementation may also include causing the one or more playback devices to adjust calibration based on the identified direction of the NMD relative to the center point of the first audio driver and second audio driver in the given azimuthal plane.

A second implementation may include causing, via a network interface, a first audio driver and a second audio driver of one or more playback devices to output audio content, where the first audio driver and the second audio driver are positioned at a known distance apart in a given azimuthal plane and recording, via a microphone, the audio content output by the first audio driver and the second audio driver. The second implementation may also include causing a processing device to identify a direction of the NMD relative to a center point of the first audio driver and second audio driver in the given azimuthal plane. Identifying the direction of the NMD may involve determining a range of possible azimuthal angles between the NMD and the center point, the range of possible angles dependent upon (i) the known distance between the first audio driver and second audio driver and (ii) a phase offset between the first audio driver and second audio driver indicated by the recorded audio content output by the first audio driver and the second audio driver. The second implementation may further include causing the one or more playback devices to adjust calibration based on the identified direction of the NMD relative to the center point of the first audio driver and second audio driver in the given azimuthal plane.

Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
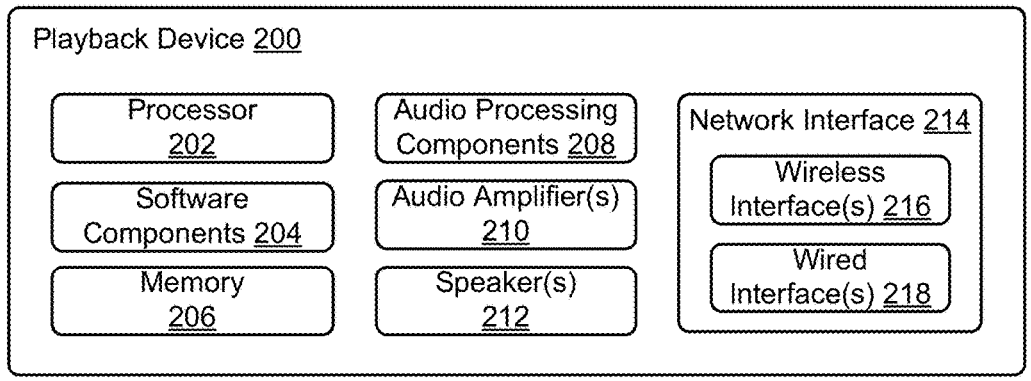
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
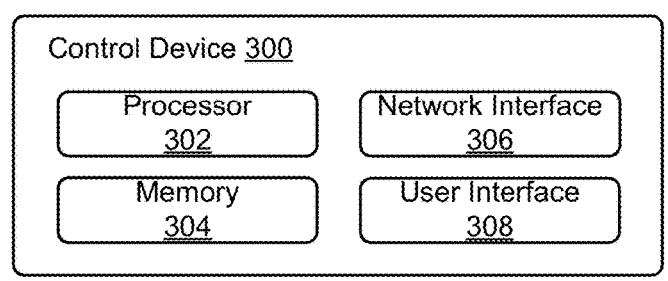
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
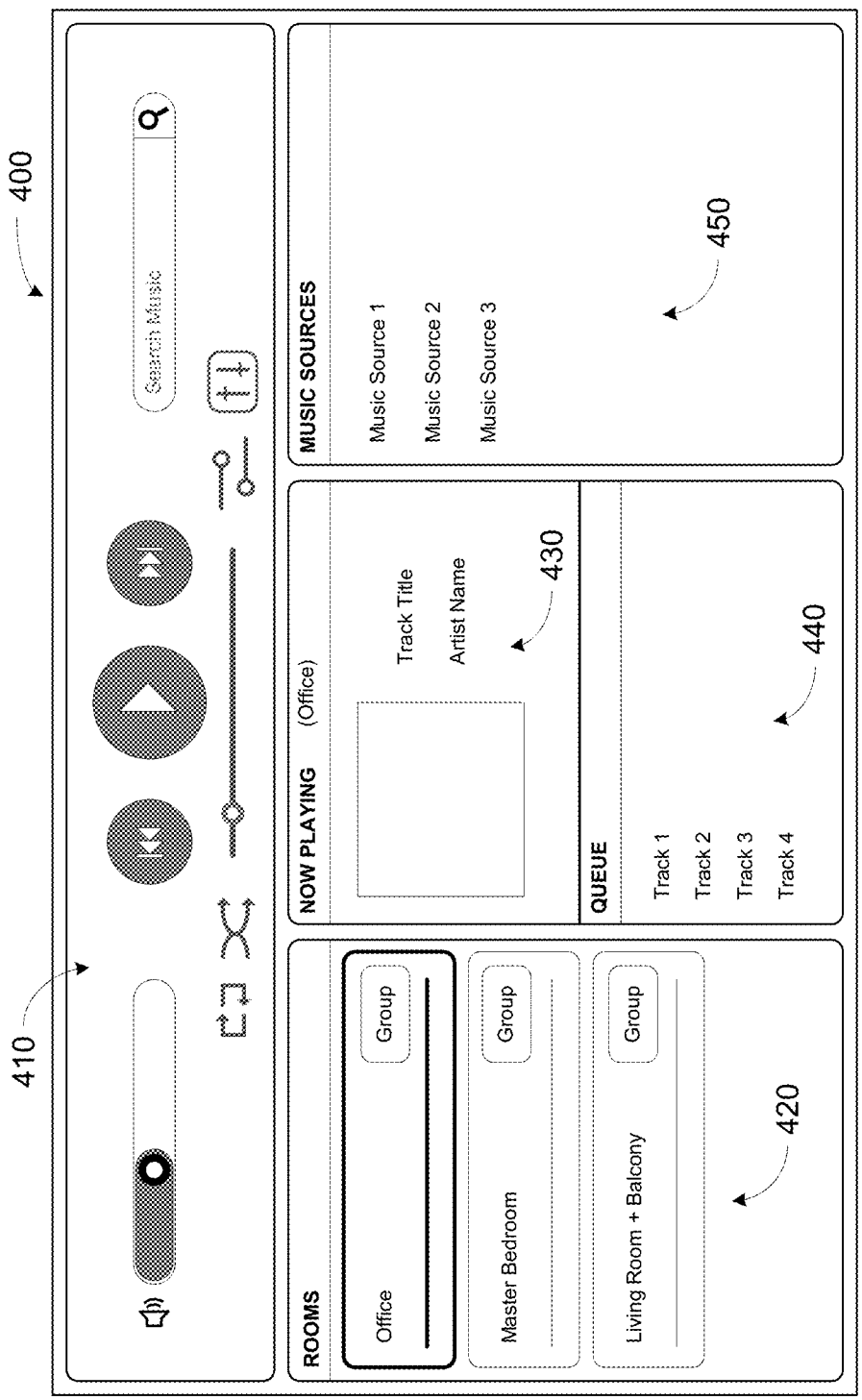
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
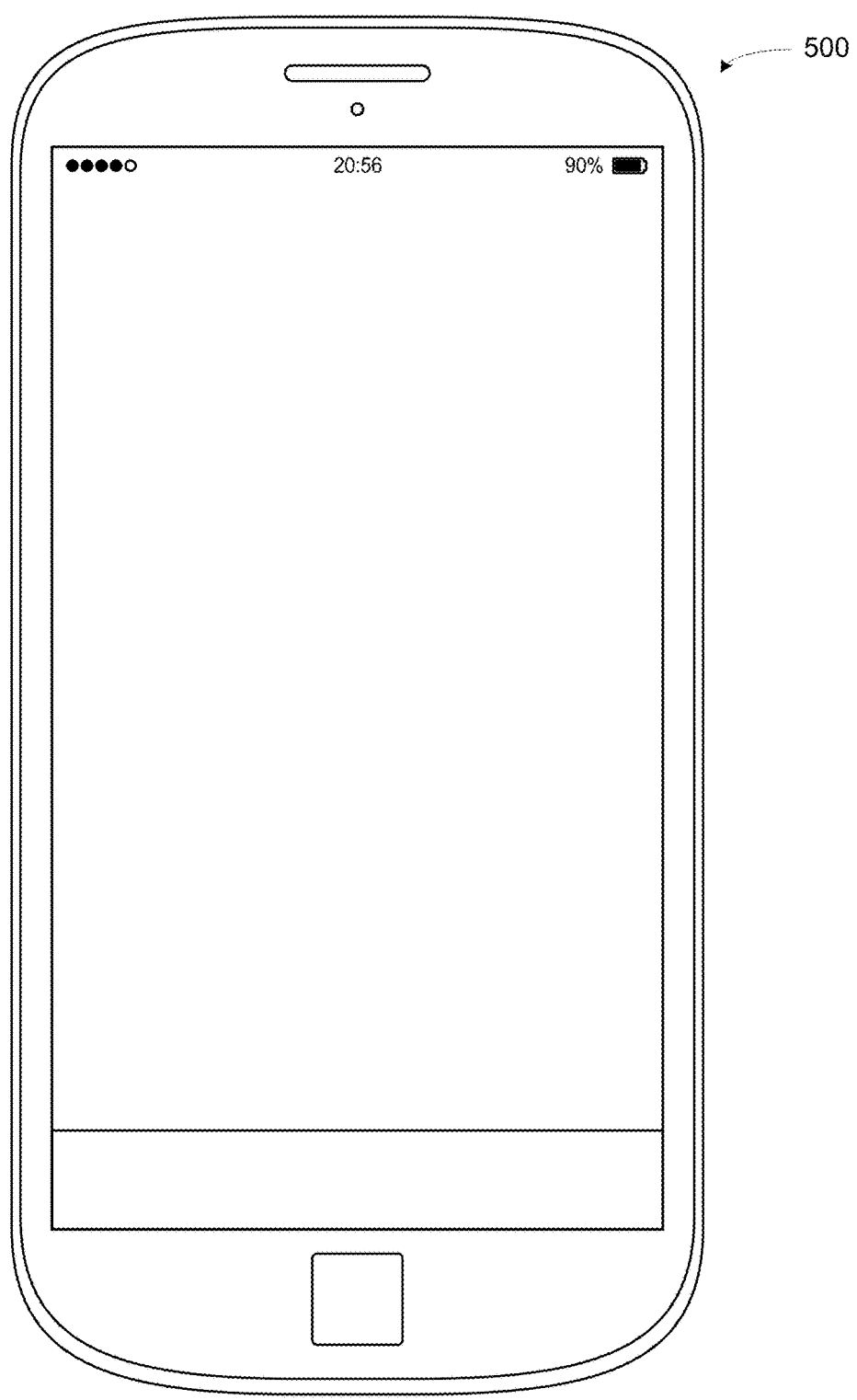
FIG. 5 shows an example control device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Plurality of Networked Devices

Figure 6:
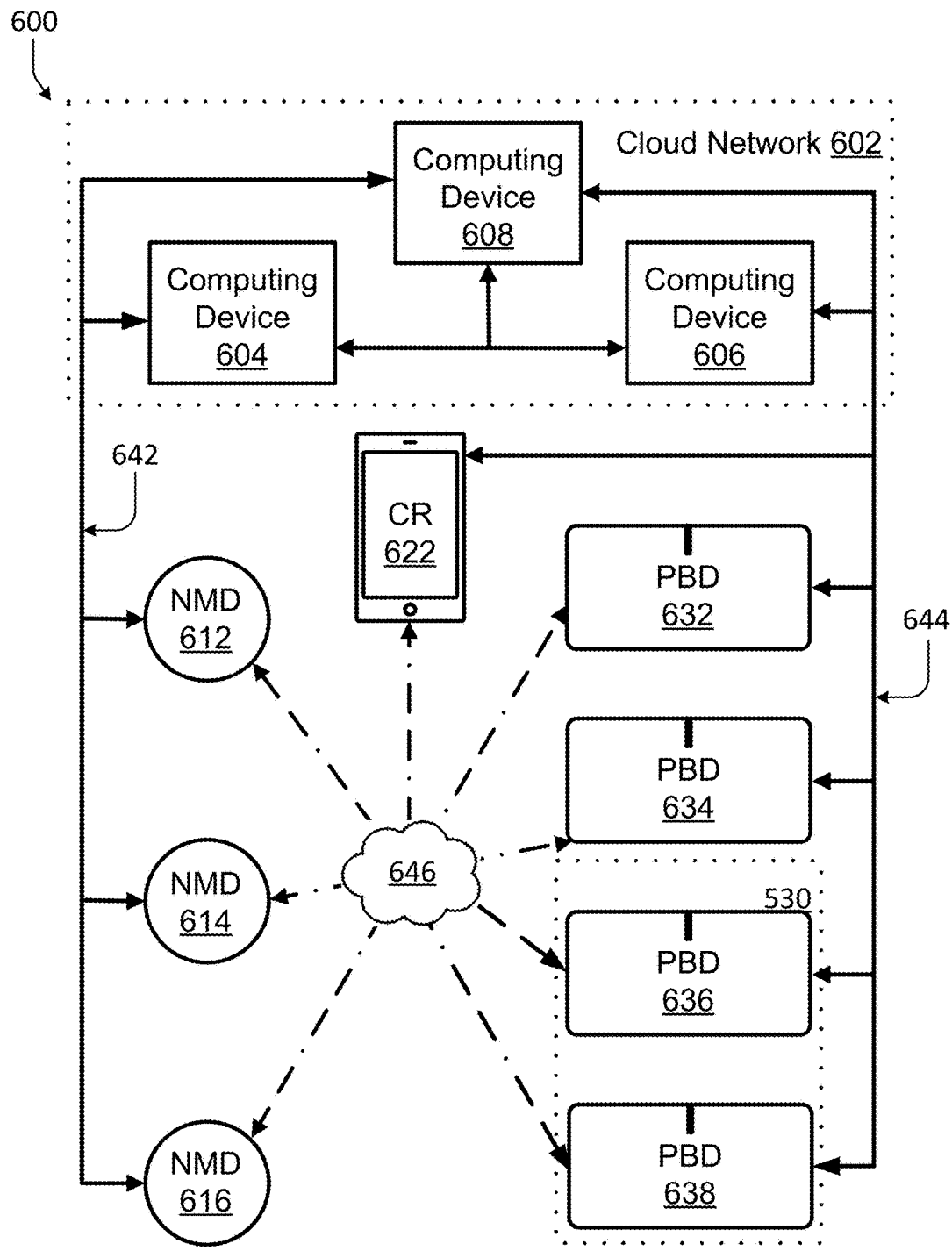
FIG. 6 shows an example plurality of network devices according to aspects described herein.

FIG. 6 shows an example plurality of devices 600 that may be configured to provide an audio playback experience based on voice control. One having ordinary skill in the art will appreciate that the devices shown in FIG. 6 are for illustrative purposes only, and variations including different and/or additional devices may be possible. As shown, the plurality of devices 600 includes computing devices 604, 606, and 608; network microphone devices (NMDs) 612, 614, and 616; playback devices (PBDs) 632, 634, 636, and 638; and a controller device (CR) 622.

Each of the plurality of devices 600 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 604, 606, and 608 may be part of a cloud network 602. The cloud network 602 may include additional computing devices. In one example, the computing devices 604, 606, and 608 may be different servers. In another example, two or more of the computing devices 604, 606, and 608 may be modules of a single server. Analogously, each of the computing device 604, 606, and 608 may include one or more modules or servers. For ease of illustration purposes herein, each of the computing devices 604, 606, and 608 may be configured to perform particular functions within the cloud network 602. For instance, computing device 608 may be a source of audio content for a streaming music service.

As shown, the computing device 604 may be configured to interface with NMDs 612, 614, and 616 via communication path 642. NMDs 612, 614, and 616 may be components of one or more "Smart Home" systems. In one case, NMDs 612, 614, and 616 may be physically distributed throughout a household, similar to the distribution of devices shown in FIG. 1. In another case, two or more of the NMDs 612, 614, and 616 may be physically positioned within relative close proximity of one another. Communication path 642 may comprise one or more types of networks, such as a WAN including the Internet, LAN, and/or PAN, among other possibilities.

In one example, one or more of the NMDs 612, 614, and 616 may be devices configured primarily for audio detection. In another example, one or more of the NMDs 612, 614, and 616 may be components of devices having various primary utilities. For instance, as discussed above in connection to FIGS. 2 and 3, one or more of NMDs 612, 614, and 616 may be the microphone(s) 220 of playback device 200 or the microphone(s) 310 of network device 300. Further, in some cases, one or more of NMDs 612, 614, and 616 may be the playback device 200 or network device 300. In an example, one or more of NMDs 612, 614, and/or 616 may include multiple microphones arranged in a microphone array.

As shown, the computing device 606 may be configured to interface with CR 622 and PBDs 632, 634, 636, and 638 via communication path 644. In one example, CR 622 may be a network device such as the network device 200 of FIG. 2. Accordingly, CR 622 may be configured to provide the controller interface 400 of FIG. 4. Similarly, PBDs 632, 634, 636, and 638 may be playback devices such as the playback device 300 of FIG. 3. As such, PBDs 632, 634, 636, and 638 may be physically distributed throughout a household as shown in FIG. 1. For illustration purposes, PBDs 636 and 638 may be part of a bonded zone 630, while PBDs 632 and 634 may be part of their own respective zones. As described above, the PBDs 632, 634, 636, and 638 may be dynamically bonded, grouped, unbonded, and ungrouped. Communication path 644 may comprise one or more types of networks, such as a WAN including the Internet, LAN, and/or PAN, among other possibilities.

In one example, as with NMDs 612, 614, and 616, CR 622 and PBDs 632, 634, 636, and 638 may also be components of one or more "Smart Home" systems. In one case, PBDs 632, 634, 636, and 638 may be distributed throughout the same household as the NMDs 612, 614, and 616. Further, as suggested above, one or more of PBDs 632, 634, 636, and 638 may be one or more of NMDs 612, 614, and 616.

The NMDs 612, 614, and 616 may be part of a local area network, and the communication path 642 may include an access point that links the local area network of the NMDs 612, 614, and 616 to the computing device 604 over a WAN (communication path not shown). Likewise, each of the NMDs 612, 614, and 616 may communicate with each other via such an access point.

Similarly, CR 622 and PBDs 632, 634, 636, and 638 may be part of a local area network and/or a local playback network as discussed in previous sections, and the communication path 644 may include an access point that links the local area network and/or local playback network of CR 622 and PBDs 632, 634, 636, and 638 to the computing device 606 over a WAN. As such, each of the CR 622 and PBDs 632, 634, 636, and 638 may also communicate with each over such an access point.

In one example, communication paths 642 and 644 may comprise the same access point. In an example, each of the NMDs 612, 614, and 616, CR 622, and PBDs 632, 634, 636, and 638 may access the cloud network 602 via the same access point for a household.

As shown in FIG. 6, each of the NMDs 612, 614, and 616, CR 622, and PBDs 632, 634, 636, and 638 may also directly communicate with one or more of the other devices via communication means 646. Communication means 646 as described herein may involve one or more forms of communication between the devices, according to one or more network protocols, over one or more types of networks, and/or may involve communication via one or more other network devices. For instance, communication means 646 may include one or more of for example, Bluetooth™ (IEEE 802.15), NFC, Wireless direct, and/or Proprietary wireless, among other possibilities.

In one example, CR 622 may communicate with NMD 612 over Bluetooth™, and communicate with PBD 634 over another local area network. In another example, NMD 614 may communicate with CR 622 over another local area network, and communicate with PBD 636 over Bluetooth. In a further example, each of the PBDs 632, 634, 636, and 638 may communicate with each other according to a spanning tree protocol over a local playback network, while each communicating with CR 622 over a local area network, different from the local playback network. Other examples are also possible.

In some cases, communication means between the NMDs 612, 614, and 616, CR 622, and PBDs 632, 634, 636, and 638 may change depending on types of communication between the devices, network conditions, and/or latency demands. For instance, communication means 646 may be used when NMD 616 is first introduced to the household with the PBDs 632, 634, 636, and 638. In one case, the NMD 616 may transmit identification information corresponding to the NMD 616 to PBD 638 via NFC, and PBD 638 may in response, transmit local area network information to NMD 616 via NFC (or some other form of communication). However, once NMD 616 has been configured within the household, communication means between NMD 616 and PBD 638 may change. For instance, NMD 616 may subsequently communicate with PBD 638 via communication path 642, the cloud network 602, and communication path 644. In another example, the NMDs and PBDs may never communicate via local communications means 646. In a further example, the NMDs and PBDs may communicate primarily via local communications means 646. Other examples are also possible.

In an illustrative example, NMDs 612, 614, and 616 may be configured to receive voice inputs to control PBDs 632, 634, 636, and 638. The available control commands may include any media playback system controls previously discussed, such as playback volume control, playback transport controls, music source selection, and grouping, among other possibilities. In one instance, NMD 612 may receive a voice input to control one or more of the PBDs 632, 634, 636, and 638. In response to receiving the voice input, NMD 612 may transmit via communication path 642, the voice input to computing device 604 for processing. In one example, the computing device 604 may convert the voice input to an equivalent text command, and parse the text command to identify a command. Computing device 604 may then subsequently transmit the text command to the computing device 606. In another example, the computing device 604 may convert the voice input to an equivalent text command, and then subsequently transmit the text command to the computing device 606. The computing device 606 may then parse the text command to identify one or more playback commands.

For instance, if the text command is "Play 'Track 1' by 'Artist 1' from 'Streaming Service 1' in 'Zone 1'," The computing device 606 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 608, and "Zone 1" may be the bonded zone 630. As such, upon identifying the URL and one or both of PBDs 636 and 638, the computing device 606 may transmit via communication path 644 to one or both of PBDs 636 and 638, the identified URL for playback. One or both of PBDs 636 and 638 may responsively retrieve audio content from the computing device 608 according to the received URL, and begin playing "Track 1" by "Artist 1" from "Streaming Service 1."

In yet another example, the computing device 604 may perform some processing to identify the relevant command or intent of the user and provide information regarding media content relevant to the voice input to the computing device 606. For example, the computing device 604 may perform the speech-to-text conversion of the voice input and analyze the voice input for a command or intent (e.g., play, pause, stop, volume up, volume down, skip, next, group, ungroup) along with other information about how to execute the command. The computing device 604 or the computing device 606 may determine what PBD commands correspond to the command or intent determined by the computing device 604. The command or intent determined from the voice input and/or other information related to executing the command may be transmitted from the computing device 604 to the computing device 606. The processing on the computing device 604 may be performed by an application, a module, add-on software, an integration with the native networked microphone system software platform, and/or the native networked microphone system software platform.

One having ordinary skill in the art will appreciate that the above is just one illustrative example, and that other implementations are also possible. In one case, operations performed by one or more of the plurality of devices 600, as described above, may be performed by one or more other devices in the plurality of device 600. For instance, the conversion from voice input to the text command may be alternatively, partially, or wholly performed by another device or devices, such as NMD 612, computing device 606, PBD 636, and/or PBD 638. Analogously, the identification of the URL may be alternatively, partially, or wholly performed by another device or devices, such as NMD 612, computing device 604, PBD 636, and/or PBD 638.

f. Example Network Microphone Device

Figure 7:
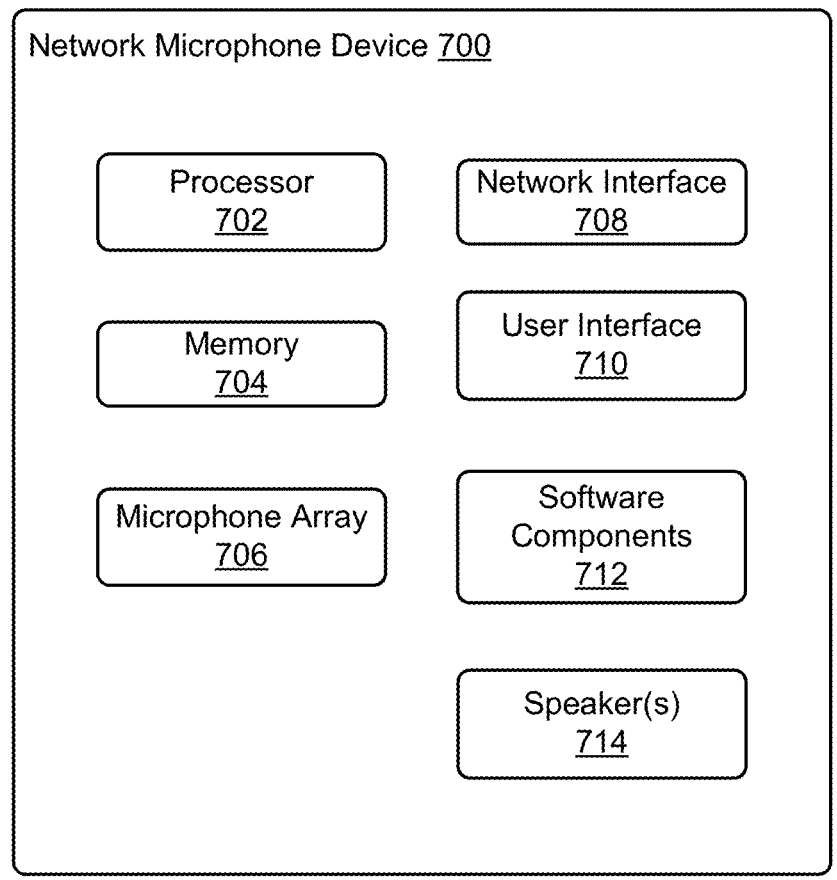
FIG. 7 shows a function block diagram of an example network microphone device according to aspects described herein.

FIG. 7 shows a function block diagram of an example network microphone device 700 that may be configured to be one or more of NMDs 712, 714, and 716 of FIG. 7. As shown, the network microphone device 700 includes a processor 702, memory 704, a microphone array 706, a network interface 708, a user interface 710, software components 712, and speaker(s) 714. One having ordinary skill in the art will appreciate that other network microphone device configurations and arrangements are also possible. For instance, network microphone devices may alternatively exclude the speaker(s) 714 or have a single microphone instead of microphone array 706.

The processor 702 may include one or more processors and/or controllers, which may take the form of a general or special-purpose processor or controller. For instance, the processing unit 702 may include microprocessors, microcontrollers, application-specific integrated circuits, digital signal processors, and the like. The memory 704 may be data storage that can be loaded with one or more of the software components executable by the processor 702 to perform those functions. Accordingly, memory 704 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 706 may be a plurality of microphones arranged to detect sound in the environment of the network microphone device 700. Microphone array 706 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 706 may be sensitive to a portion of a frequency range. In one example, a first subset of the microphone array 706 may be sensitive to a first frequency range, while a second subset of the microphone array may be sensitive to a second frequency range. The microphone array 706 may further be arranged to capture location information of an audio source (e.g., voice, audible sound) and/or to assist in filtering background noise. Notably, in some embodiments the microphone array may consist of only a single microphone, rather than a plurality of microphones.

The network interface 708 may be configured to facilitate wireless and/or wired communication between various network devices, such as, in reference to FIG. 7, CR 722, PBDs 732-738, computing device 704-708 in cloud network 702, and other network microphone devices, among other possibilities. As such, network interface 708 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 708 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 710 of the network microphone device 700 may be configured to facilitate user interactions with the network microphone device. In one example, the user interface 708 may include one or more of physical buttons, graphical interfaces provided on touch sensitive screen(s) and/or surface(s), among other possibilities, for a user to directly provide input to the network microphone device 700. The user interface 710 may further include one or more of lights and the speaker(s) 714 to provide visual and/or audio feedback to a user. In one example, the network microphone device 700 may further be configured to playback audio content via the speaker(s) 714.

g. Example Calibration Sequence

As indicated above, example calibration procedures may involve one or more playback devices emitting a calibration sound, which may be detected by a recording device (or multiple recording devices).

In some embodiments, the detected calibration sounds may be analyzed across a range of frequencies over which the playback device is to be calibrated (i.e., a calibration range). Accordingly, the particular calibration sound that is emitted by a playback device covers the calibration frequency range. The calibration frequency range may include a range of frequencies that the playback device is capable of emitting (e.g., 15-30,000 Hz) and may be inclusive of frequencies that are considered to be in the range of human hearing (e.g., 20-20,000 Hz). By emitting and subsequently detecting a calibration sound covering such a range of frequencies, a frequency response that is inclusive of that range may be determined for the playback device. Such a frequency response may be representative of the environment in which the playback device emitted the calibration sound.

In some embodiments, a playback device may repeatedly emit the calibration sound during the calibration procedure such that the calibration sound covers the calibration frequency range during each repetition. With a moving microphone, repetitions of the calibration sound are continuously detected at different physical locations within the environment. For instance, the playback device might emit a periodic calibration sound. Each period of the calibration sound may be detected by the recording device at a different physical location within the environment thereby providing a sample (i.e., a frame representing a repetition) at that location. Such a calibration sound may therefore facilitate a space-averaged calibration of the environment. When multiple microphones are utilized, each microphone may cover a respective portion of the environment (perhaps with some overlap).

Yet further, the recording devices may measure both moving and stationary samples. For instance, while the one or more playback devices output a calibration sound, a recording device may move within the environment. During such movement, the recording device may pause at one or more locations to measure stationary samples. Such locations may correspond to preferred listening locations. In another example, a first recording device and a second recording device may include a first microphone and a second microphone respectively. While the playback device emits a calibration sound, the first microphone may move and the second microphone may remain stationary, perhaps at a particular listening location within the environment (e.g., a favorite chair).

In some cases, the one or more playback devices may be joining into a grouping, such as a bonded zone or zone group. In such cases, the calibration procedure may calibrate the one or more playback devices as a group. Example groupings include zone groups or bonded pairs, among other example configurations.

The playback device(s) under calibration may initiate the calibration procedure based on a trigger condition. For instance, a recording device, such as control device 126 of media playback system 100, may detect a trigger condition that causes the recording device to initiate calibration of one or more playback devices (e.g., one or more of playback devices 102-124). Alternatively, a playback device of a media playback system may detect such a trigger condition (and then perhaps relay an indication of that trigger condition to the recording device).

In some embodiments, detecting the trigger condition may involve detecting input data indicating a selection of a selectable control. For instance, a recording device, such as control device 126, may display an interface (e.g., control interface 400 of FIG. 4), which includes one or more controls that, when selected, initiate calibration of a playback device, or a group of playback devices (e.g., a zone).

Figure 8:
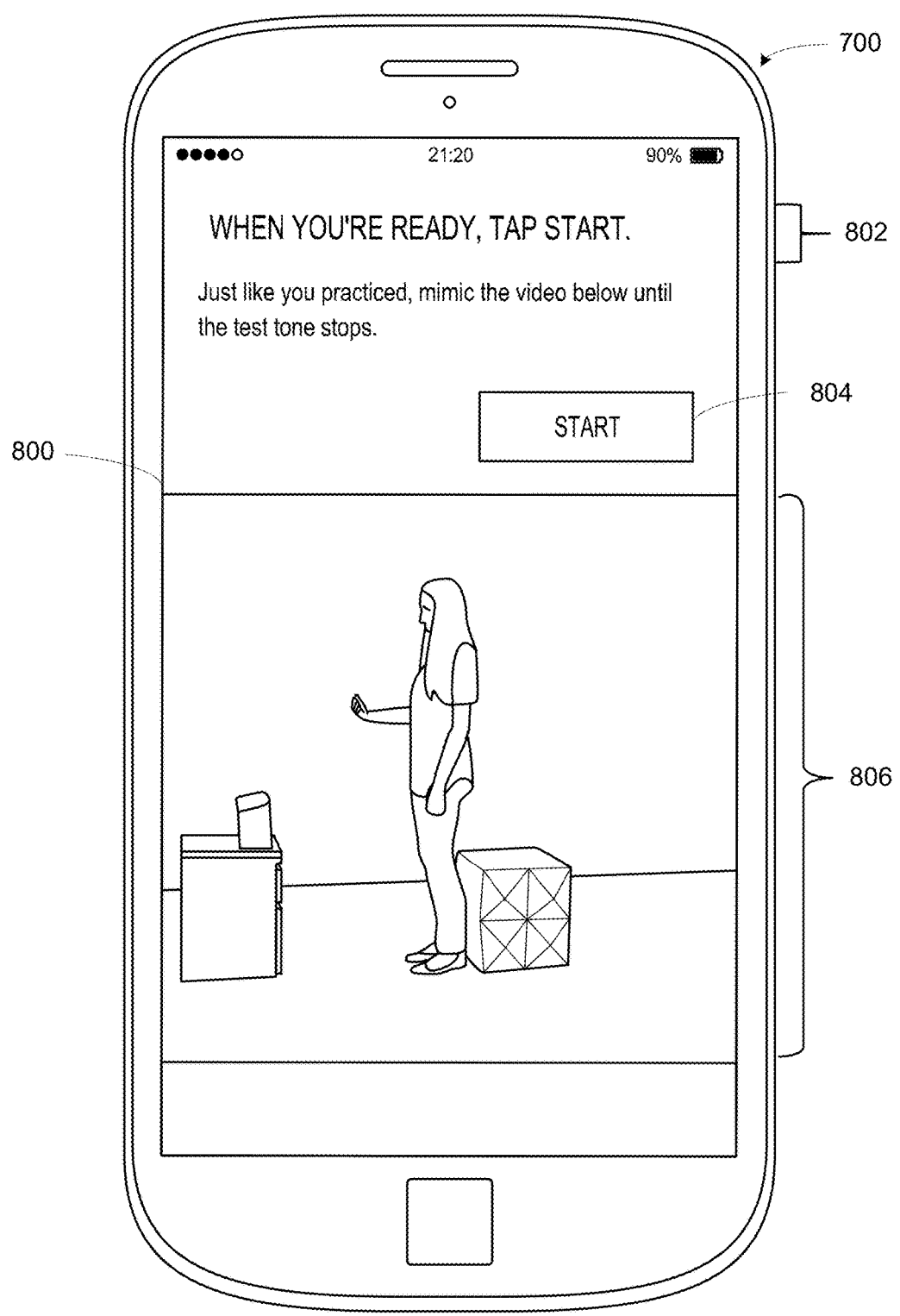
FIG. 8 shows a smartphone that is displaying an example control interface, according to an example implementation.

To illustrate such a control, FIG. 8 shows smartphone 500 which is displaying an example control interface 800. Control interface 800 includes a graphical region 802 that prompts to tap selectable control 804 (Start) when ready. When selected, selectable control 804 may initiate the calibration procedure. As shown, selectable control 804 is a button control. While a button control is shown by way of example, other types of controls are contemplated as well.

Control interface 800 further includes a graphical region 806 that includes a video depicting how to assist in the calibration procedure. Some calibration procedures may involve moving a microphone through an environment in order to obtain samples of the calibration sound at multiple physical locations. In order to prompt a user to move the microphone, the control device may display a video or animation depicting the step or steps to be performed during the calibration.

Figure 9:
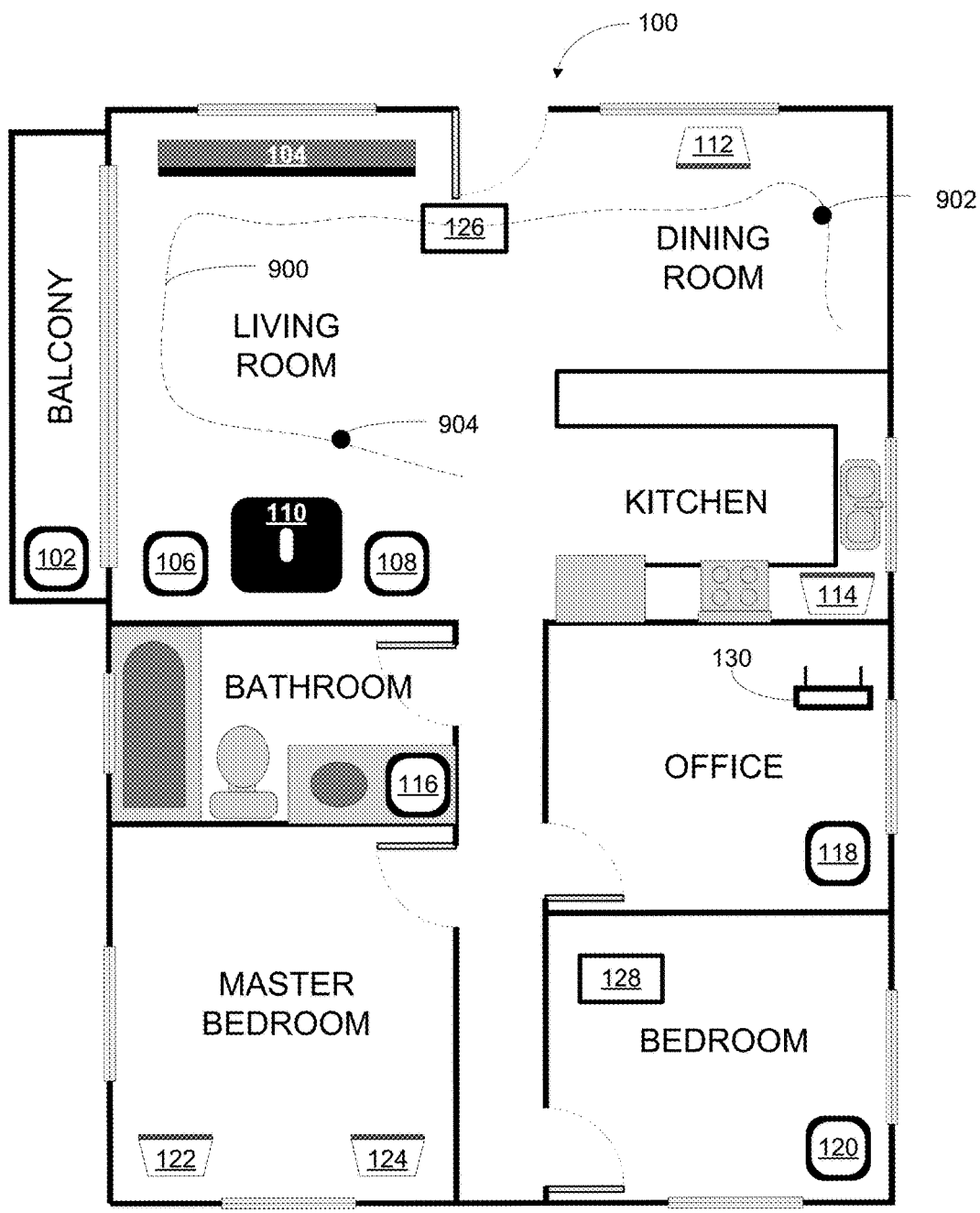
FIG. 9 illustrates an example movement through an example environment in which an example media playback system is positioned.

To illustrate movement of the control device during calibration, FIG. 9 shows media playback system 100 of FIG. 1. FIG. 9 shows a path 900 along which a recording device (e.g., control device 126) might be moved during calibration. As noted above, the recording device may indicate how to perform such a movement in various ways, such as by way of a video or animation, among other examples. A recording device might detect iterations of a calibration sound emitted by one or more playback devices of media playback system 100 at different points along the path 900, which may facilitate a space-averaged calibration of those playback devices.

In other examples, detecting the trigger condition may involve a playback device detecting that the playback device has become uncalibrated, which might be caused by moving the playback device to a different position. For example, the playback device may detect physical movement via one or more sensors that are sensitive to movement (e.g., an accelerometer). As another example, the playback device may detect that it has been moved to a different zone (e.g., from a "Kitchen" zone to a "Living Room" zone), perhaps by receiving an instruction from a control device that causes the playback device to leave a first zone and join a second zone.

In further examples, detecting the trigger condition may involve a recording device (e.g., a control device or playback device) detecting a new playback device in the system. Such a playback device may have not yet been calibrated for the environment. For instance, a recording device may detect a new playback device as part of a set-up procedure for a media playback system (e.g., a procedure to configure one or more playback devices into a media playback system). In other cases, the recording device may detect a new playback device by detecting input data indicating a request to configure the media playback system (e.g., a request to configure a media playback system with an additional playback device).

In some cases, the first recording device (or another device) may instruct the one or more playback devices to emit the calibration sound. For instance, a recording device, such as control device 126 of media playback system 100, may send a command that causes a playback device (e.g., one of playback devices 102-124) to emit a calibration sound. The control device may send the command via a network interface (e.g., a wired or wireless network interface). A playback device may receive such a command, perhaps via a network interface, and responsively emit the calibration sound.

Acoustics of an environment may vary from location to location within the environment. Because of this variation, some calibration procedures may be improved by positioning the playback device to be calibrated within the environment in the same way that the playback device will later be operated. In that position, the environment may affect the calibration sound emitted by a playback device in a similar manner as playback will be affected by the environment during operation.

Further, some example calibration procedures may involve one or more recording devices detecting the calibration sound at multiple physical locations within the environment, which may further assist in capturing acoustic variability within the environment. To facilitate detecting the calibration sound at multiple points within an environment, some calibration procedures involve a moving microphone. For example, a microphone that is detecting the calibration sound may be moved through the environment while the calibration sound is emitted. Such movement may facilitate detecting the calibration sounds at multiple physical locations within the environment, which may provide a better understanding of the environment as a whole.

In some embodiments, the one or more playback devices may repeatedly emit the calibration sound during the calibration procedure such that the calibration sound covers the calibration frequency range during each repetition. With a moving microphone, repetitions of the calibration sound are detected at different physical locations within the environment, thereby providing samples that are spaced throughout the environment. In some cases, the calibration sound may be periodic calibration signal in which each period covers the calibration frequency range.

Further example calibration procedures are described in U.S. patent application Ser. No. 14/805,140 filed Jul. 21, 2015, entitled "Hybrid Test Tone For Space-Averaged Room Audio Calibration Using A Moving Microphone," U.S. patent application Ser. No. 14/805,340 filed Jul. 21, 2015, entitled "Concurrent Multi-Loudspeaker Calibration with a Single Measurement," and U.S. patent application Ser. No. 14/864,393 filed Sep. 24, 2015, entitled "Facilitating Calibration of an Audio Playback Device," which are incorporated herein in their entirety.

Calibration may be facilitated via one or more control interfaces, as displayed by one or more devices. Example interfaces are described in U.S. patent application Ser. No. 14/696,014 filed Apr. 24, 2015, entitled "Speaker Calibration," and U.S. patent application Ser. No. 14/826,873 filed Aug. 14, 2015, entitled "Speaker Calibration User Interface," which are incorporated herein in their entirety.

Figure 10:
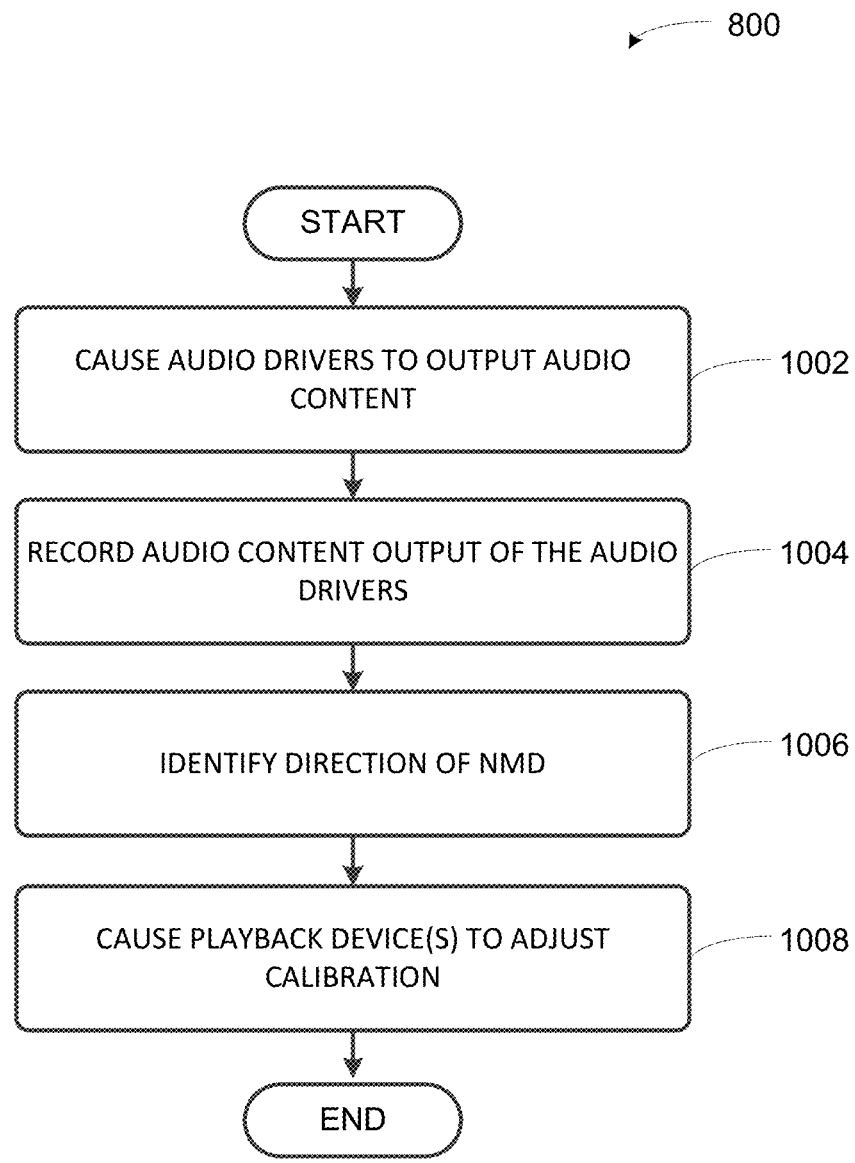
FIG. 10 shows an example flow diagram to adjust calibration based on a direction of an NMD.
Figure 15:
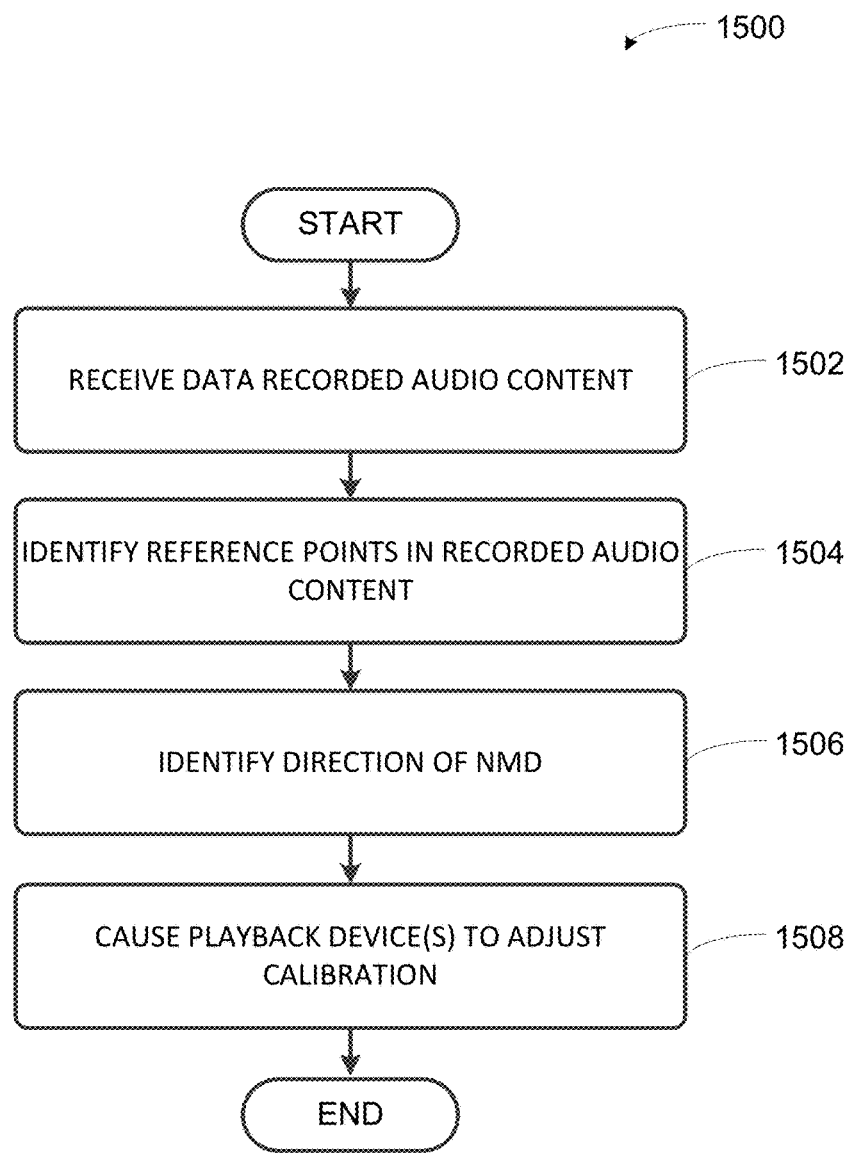
FIG. 15 shows an example flow diagram to determine a direction of an NMD.

Moving now to several example implementations, implementations 1000 and 1500 shown in FIGS. 10 and 15, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3, as well as other devices described herein and/or other suitable devices. Further, operations illustrated by way of example as being performed by a media playback system can be performed by any suitable device, such as a playback device or a control device of a media playback system. Implementations 1000 and 1500 may include one or more operations, functions, or actions as illustrated by one or more of blocks shown in FIGS. 10 and 15. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

III. Example Techniques to Adjust Calibration Based on Direction of NMD

As discussed above, embodiments described herein may facilitate determining the position of a NMD relative to two or more audio drivers. FIG. 10 illustrates an example implementation 1000 by which an NMD adjusts calibration of one or more playback devices based on the determined direction of the NMD relative to two or more audio drivers housed in a playback device (or in multiple playback devices).

a. Cause Audio Drivers to Output Audio Content

At block 1002, implementation 1000 involves causing two or more audio drivers to output audio content. For instance, a NMD may cause a first audio driver and a second audio driver to output audio content. Example NMDs include suitable device having a microphone and a network interface such as control devices 126 and 128 of FIG. 1, playback device 200 of FIG. 2, control device 300 of FIG. 3, or smartphone 500 of FIG. 5. In some cases, a NMD (e.g., control device 126 of FIG. 1) may send, via a network interface, a command to a playback device (e.g., playback device 104 of FIG. 1) that causes audio drivers of the playback device to output particular audio content. A playback device may receive such a command, perhaps via a network interface, and responsively output the audio content.

The two or more audio drivers may be in a single playback device or in multiple playback devices. For instance, a playbar-type playback device (e.g., playback device 104) may include multiple audio drivers (e.g., nine audio drivers) arranged in a given azimuthal plane (e.g., horizontal). Alternatively, two playback devices (e.g., playback devices 122 and 124) may each include a respective audio driver (or respective sets of audio drivers). Example arrangements of multiple playback devices include a stereo pair or a home theatre (surround sound) configuration.

Whether the two (or more) audio drivers are housed in a single playback device or in multiple playback devices, the distance between the two audio drivers in a given azimuthal plane must be known. By housing the two audio drivers in a single playback device, the distance between the drivers may be fixed by way of the audio drivers being mounted within the housing. This distance may be pre-determined (perhaps by the manufacturer) and maintained in data storage of the NMD or that the NMD has access to.

Figure 11:
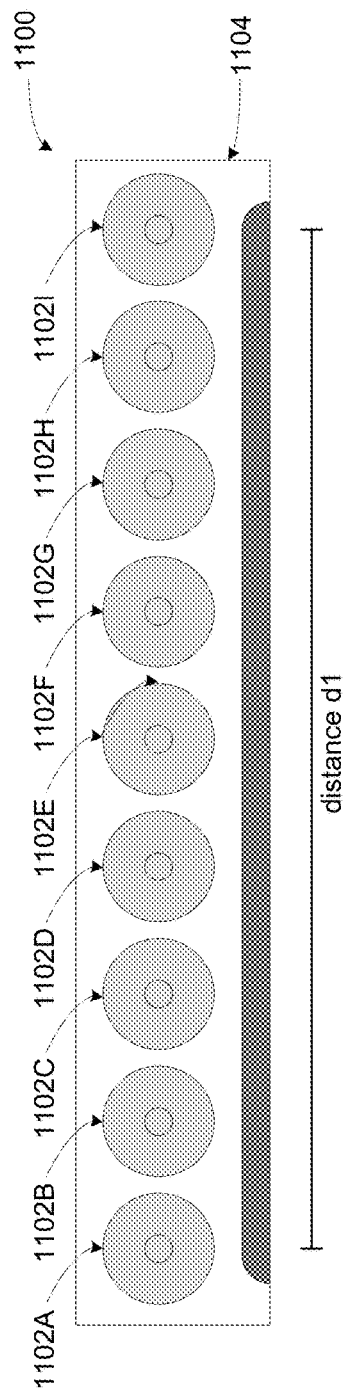
FIG. 11 shows an example playback device with multiple audio drivers.

To illustrate, FIG. 11 shows an example playback device 1100 that includes multiple audio drivers. In particular, playback device 1100 is a playbar-type playback device that includes audio drivers 1102A, 1102B, 1102C, 1102D, 1102E, 1102F, 1102G, 1102H, and 1102I all mounted in a housing 1104. These audio drivers may be used to form various sound axes. For instance, in a home theater playback configuration, audio drivers 1102A, 1102B, 1102C, 1102D, 1102E, 1102F, 1102G, 1102H, and 1102I may form sound axes corresponding to front left, center, and front right audio channels. Alternatively, in another playback configuration, audio drivers 1102A, 1102B, 1102C, 1102D, 1102E, 1102F, 1102G, 1102H, and 1102I may form another set of sound axes corresponding to left and right channels of audio content recorded in stereo. As shown, audio drivers 1102A, 1102B, 1102C, 1102D, 1102E, 1102F, 1102G, 1102H, and 1102I are aligned in a horizontal azimuthal plane. In some implementations, audio drivers 1102A and 1102I, being located the furthest apart of the audio drivers of playback device 1100, may be used. Audio drivers 1102A and 1102I are located at a distance d1 apart from one another in the horizontal plane.

Figure 12:
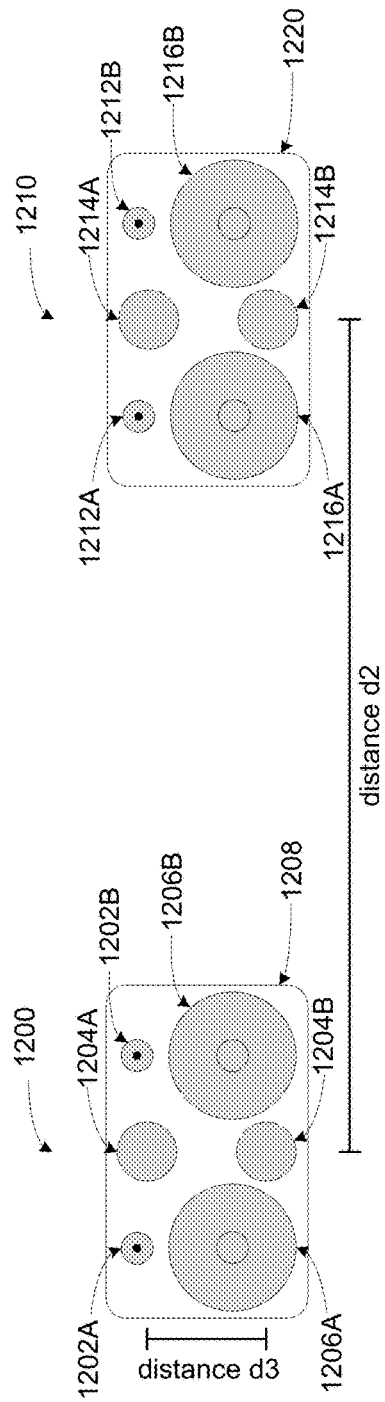
FIG. 12 shows example playback devices with respective audio drivers.

When the two audio drivers are housed in separate playback devices, the distance between the audio drivers may vary based on where each playback device is positioned within an environment (e.g., a room). To illustrate, FIG. 12 shows example playback device 1200 and playback device 1210. Playback devices 1200 and 1210 include multiple respective audio drivers of different types. In particular, playback device 1200 includes tweeters 1202A and 1202B, mid-range woofers 1204A and 1204B, and subwoofers 1206A and 1206B in a housing 1208. Likewise, playback device 1210 includes tweeters 1212A and 1212B, mid-range woofers 1214A and 1214B, and subwoofers 1216A and 1216B in a housing 1218. Woofers 1204A and 1214A are located at a distance d2 apart from one another in the horizontal plane (as are woofers 1204B and 1214B and other pairs of audio drivers of the two playback devices). Woofers 1204A and 1204B are located at a distance d3 apart from one another in the vertical plane (as are woofers 1214A and 1214B of playback device 1210).

Any suitable technique may be used to determine the distance between the audio drivers. In some cases, distance may be determined using time-of-flight of sound waves between the two playback devices. For instance, a first playback device may output audio at a first time and a second playback device may detect that audio using a microphone at a second time. The difference between the first time and the second time represents the time-of-flight between the playback devices. The distance between the audio drivers is equivalent to the time-of-flight multiplied by the speed of sound. Other suitable techniques might involve measuring time-of-flight of wireless communications (e.g., IEEE 802.11 transmissions) or manual input of distance.

The audio content outputted by the two audio drivers may be any known audio content. The particular audio content used may depend upon the context in which the present techniques are applied. For instance, if the technique is applied during calibration, calibration audio (e.g., a frequency sweep ("chirp"), noise, a song, or any of the example calibration sounds described above in connection with the example calibration procedure) might be used. Alternatively, if the technique is applied during media playback, a pre-recorded audio track (e.g., a song) may be used. Using known content facilitates comparison of audio output from each audio driver. Some implementations might not necessarily use known content if the two audio drivers are caused to output identical content, as identical content may likewise facilitate comparison of audio output from each audio driver. The audio content may be stored locally (e.g., on the NMD, the playback device, or on another device that is communicatively coupled to the playback device via a local area network) or remotely (e.g., streamed from one or more servers of a streaming media service).

As noted above, example techniques may involve comparing the apparent phase offset between the two audio drivers. As such, in some implementations, the audio content output from the two or more audio drivers is assumed to be closely synchronized (i.e., on the order of milliseconds of phase difference). With such close synchronization, differences in apparent phase offset between the two audio drivers in recorded audio may be assumed to come from relative positioning of the two audio drivers relative to the NMD that is recorded the output. In some examples, synchronization among the audio drivers is yielded by way of using a common amplifier to drive physically similar audio drivers (e.g., two or more drivers of the same make and model). Alternatively, each audio driver's phase may be known (e.g., pre-determined) and compensated for by an audio stage in the playback device, perhaps by introducing delay using one or more analog or digital filters.

In some implementations, the two audio drivers output audio concurrently. Concurrent output of the audio content may facilitate comparison by providing a common time that the respective audio content is output by each audio driver. However, audio content need not necessarily be outputted concurrently by the two audio drivers. Some implementations may involve the audio drivers outputting respective audio content at known offset intervals. Since the offsets between audio drivers are known, they can be compensated for during processing.

b. Record Audio Content Output of the Audio Drivers

Referring back to FIG. 10, at block 1004, implementation 1000 involves recording the audio content output of the audio drivers. For example, an NMD may record, via a microphone, the audio content output of a first audio driver and a second audio driver (e.g., any of the pairs of audio drivers noted above). The microphone of the NMD may be unidirectional, which generates a mon-channel audio recording representing the audio content output of the two (or more) audio drivers.

The NMD may begin recording audio content output of the audio drivers based on various trigger events or conditions. Such trigger events may be related to conditions in which the present techniques may facilitate operation of the NMD or the playback device(s) by providing the relative positioning of the NMD to the playback device(s). For instance, in some cases, the NMD may facilitate calibration of the playback devices by recording calibration audio emitted by the playback devices. In such cases, a trigger event may correspond to when the playback devices begin to output the calibration audio. In some cases, a calibration sequence may be initiated by user input requesting calibration. Alternatively, calibration may be initiated when the media playback system detects a change in configuration of the playback system. Other trigger conditions related to calibration are indicated above in connection with the example calibration sequence.

Various trigger events or conditions that trigger recording may occur during media playback. For instance, a sensor of the NMD or the playback device(s) may detect motion, which may indicate that the NMD is being moved. As movement may indicate a change in the relative positioning of the NMD and the playback device, detecting movement may trigger the NMD to record audio so as to facilitate the present techniques to determine the relative positioning of the NMD and the playback device. In some embodiments, the NMD may perform the present techniques periodically, so as to maintain conception of the relative positioning of the NMD to the playback device(s).

c. Cause Processing Device to Identify a Direction of NMD

In FIG. 10, at block 1006, implementation 1000 involves causing a processing device to identify a direction of the NMD. For instance, the NMD may cause a processing device to identify a direction of the NMD based on the recorded audio content output of the playback device(s). In some cases, the NMD may include the processing device. Alternatively, the NMD may transmit the recorded audio to one or more other processing devices for processing, perhaps via a network interface. Example processing devices include playback devices, control devices, a computing device connected to the media playback system via a local area network, a remote computing device such as a cloud server, or any combination of the above.

To identify the direction of the NMD, the processing device may determine a phase offset between the two audio drivers. The phase offset may indicate the relative distances between the NMD and the respective audio drivers. Such distances may be used to determine the direction of the NMD relative to the audio drivers. Unless the NMD is located directly on-axis with the two audio drivers (i.e., perpendicular to a line between the two audio drivers), audio from each driver will reach the microphone of the NMD at different times.

Figure 13:
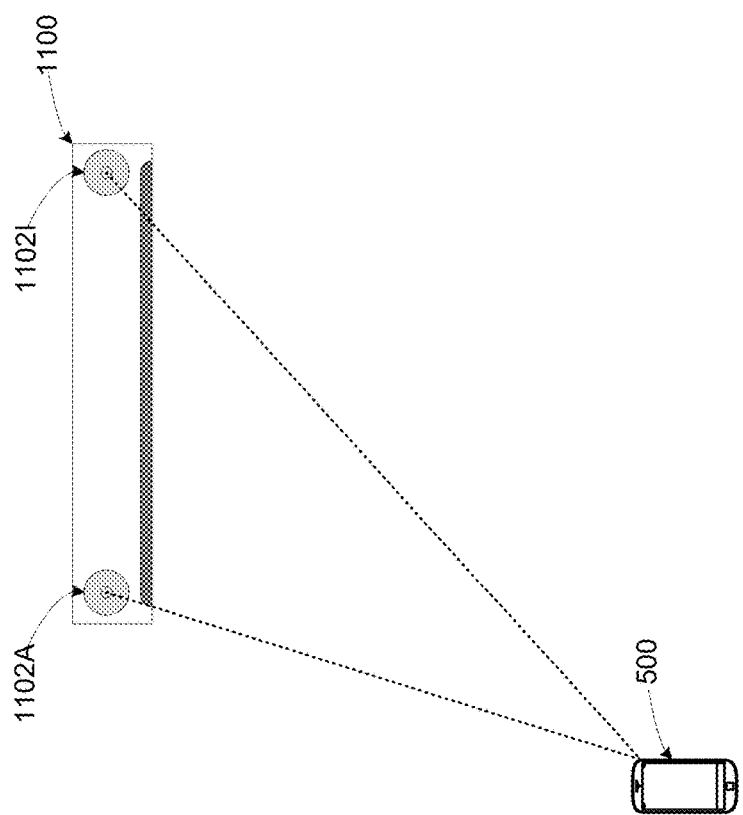
FIG. 13 shows example positioning of a NMD relative to the audio drivers of an example playback device.

To illustrate, FIG. 13 shows smartphone 500 and playback device 1100. In this example, smartphone 500 is operating as the NMD. As such, a microphone of smartphone 500 is recording audio content output of audio drivers 1102A and 1102I of playback device 1100. Given the relative positioning of smartphone 500 to audio drivers 1102A and 1102I (i.e., to the side), sound output from audio driver 1102A will typically arrive at the microphone of smartphone 500 before sound output from audio driver 1102I (assuming a direct path from each audio driver to the smartphone 500). In some cases, environmental variability may change the relative paths of sound from each audio driver to the NMD. For instance, an object between audio driver 1102A and smartphone 500 may absorb and/or reflect audio from audio driver 1102A and thereby prevent audio from directly travelling to the smartphone 500. However, some present techniques may assume that in typical operating environments (e.g., rooms of a home or other building), the environment will not alter the natural order of arrival.

To facilitate determining the phase offset between the two audio drivers, the processing device may determine a response of the recorded audio content output of the playback device(s). For instance, the processing device may determine an impulse response based on a mono recording of the audio content output of the playback device(s). Any suitable technique may be used to determine the impulse response.

The impulse response may represent the response of the surrounding environment to the audio content output of the audio drivers at a given frequency. The frequency used may depend upon the type of audio driver used to output the audio content. For instance, a frequency between 300 Hz to 2.5 kHz might be used when the output audio drivers are mid-range woofers. As another example, a frequency between 8 kHz to 14 kHz may be used when the output audio drivers are tweeters. These ranges are provided by way of example and should not be considered limiting.

As noted above, causing both audio drivers to emit the same audio content may facilitate comparison between the respective outputs of the audio drivers in a recording of the audio content output. Where both audio drivers emit the same audio content, a recording of the audio content output of the audio drivers may indicate similar waveforms albeit with different times-of-arrival at the microphone (unless the NMD is located directly on-axis with the two audio drivers). The difference between these times-of-arrival indicates the phase offset between the two audio drivers.

To determine the phase offset between the two audio drivers based on such a recording, the processing device may identify, within the impulse response, a first reference point corresponding to a particular frequency of the audio content played by a first audio driver at a particular point-in-time and also a second reference point corresponding to the particular frequency of the audio content played by a second audio driver at the particular point-in-time. In other words, the processing device may identify in the impulse response, respective points corresponding to the same audio content emitted by the audio drivers at a given instant. In some cases, the identified reference points are the first and second peak values within the impulse response. The first peak value may represent the main component of the audio output from the audio driver that is relatively closer to the microphone (e.g., audio driver 1102A in FIG. 11). The second peak value may represent the main component of the audio output from the audio driver that is relatively further away from the microphone (e.g., audio driver 1102I in FIG. 11).

As noted above, more than two audio drivers may be utilized in example techniques. If a given implementation involves more than two audio drivers outputting the audio content, the audio content emitted by each driver may include a respective watermark (e.g., a phase watermark introduced by time-warping the audio content by different amounts). Such watermarks may identify which response in the phase domain correlates to the physical output of each audio driver as recorded by the NMD.

However, while identical content may facilitate comparison, using identical content is not required. Where a first audio driver and a second audio driver output different content (e.g., left and right channels of a given audio track), the implementation may be altered to determine the phase content based on the different audio content.

In some examples, the processing device may duplicate the recording of the audio content output of the audio drivers to yield a copy of the recording corresponding to each audio driver (e.g., a first copy and a second copy for an implementation that uses two audio drivers). The processing device may filter, from the first copy, the magnitude component of the impulse response of the second audio content. Likewise, the processing device may filter, from the second copy, the magnitude component of the impulse response of the first audio content. The processing device may then determine impulse responses from each of the filtered recordings. Each impulse response may represent output from a respective audio driver.

To determine the phase offset(s) between the audio drivers from such responses, the processing device may identify respective reference points in each response. For instance, the processing device may identify a reference point in an impulse response of a first filtered recording. This first reference point (e.g., a peak value in the impulse response) corresponds to a particular frequency of the audio content as played by a first audio driver at a particular point-in-time. The processing device may also identify a reference point in an impulse response of a second filtered recording. This second reference point (e.g., a peak value in the impulse response) corresponds to the particular frequency of the audio content as played by a second audio driver at the particular point-in-time. In other words, the reference points represent the content played by each audio driver at a particular point-in-time.

After identifying the reference points in the response(s), the processing device may compare the reference points to determine the phase offset(s) between audio drivers. For instance, the processing device may determine the time difference between a first peak value and a second peak value in a given response. Alternatively, the processing device may determine the time difference between reference points in respective responses (given that the responses are time-aligned). The processing device may determine the time difference by computing the difference between the phase coordinate of the first peak from the phase coordinate of the second peak (and perhaps other subsequent peaks corresponding to output by respective audio drivers). A time difference between two reference points represents a time-domain phase offset between two audio drivers.

After determining the phase offset between two (or more) audio drivers, the processing device may verify that that the determined phase offset is in a practical range. An example range of phase offsets includes phases offsets from 0 seconds (i.e., the NMD is on-axis with the audio drivers such that the time-of-flight of sound waves from each driver to the NMD is the same) to a maximum equivalent to the distance d between the audio drivers divided by the speed of sound. This maximum phase offset represents a situation where the NMD is 90° from being on-axis with the audio drivers). The processing device may determine whether the determined phase offset is within such a range. If the processing device is outside the range, the processing device may attempt to continue by determining a new impulse response (perhaps based on a different frequency) or by identifying different reference points in the impulse responses. Alternatively, the audio drivers and the NMD may repeat the process of emitting audio content and recording the output so as to provide the processing device with another recording. As another example, the NMD may send and/or display an error message indicating that the NMD is improperly positioned for a given operation (e.g., calibration of the playback devices).

With the known distance(s) between the audio drivers and the determined phase offset, the processing device may determine the azimuthal angle θ between the audio drivers and the NMD. This azimuthal angle θ may be determined from the center point between the audio drivers, or from any point along the line between the drivers. The azimuthal angle θ is based on the geometric relationship constrained by the known distance(s) between the audio drivers, the determined phase offset, and the speed of sound.

Figure 14:
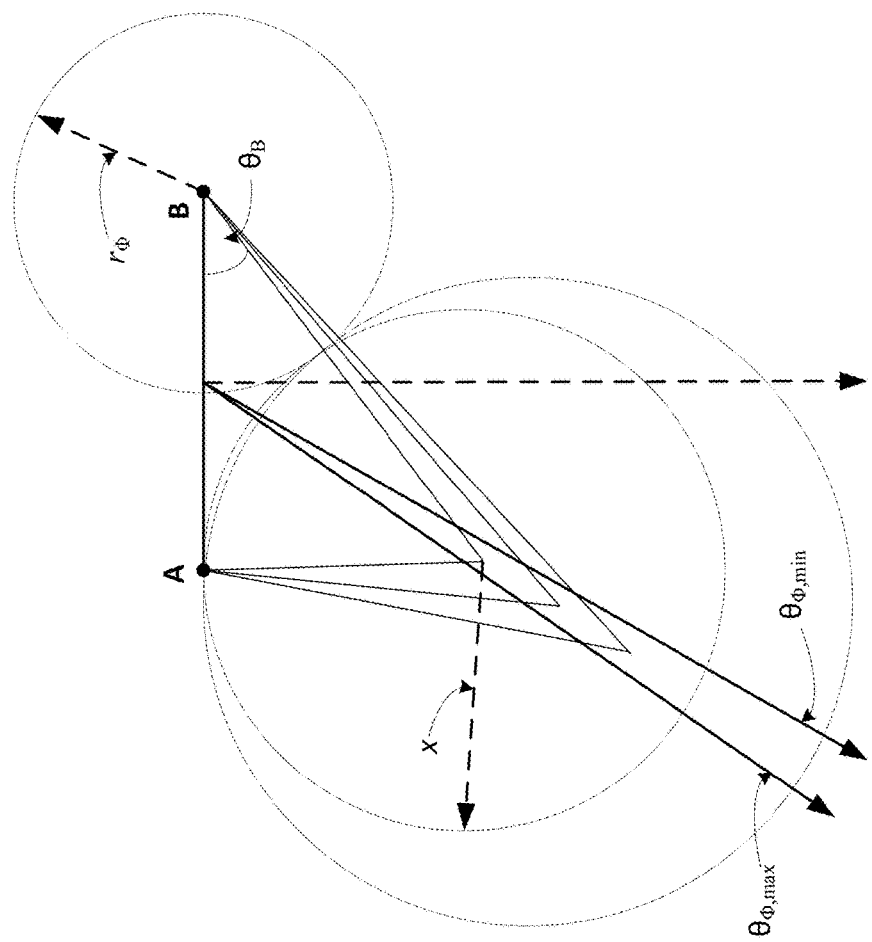
FIG. 14 shows a diagram illustrating an example geometric relationship between a NMD and two audio drivers.

By way of example, FIG. 14 shows a diagram illustrating the geometric relationship between a first audio driver A, a second audio driver B, and an NMD that is located between $\theta_{\Phi,min}$ and $\theta_{\Phi,max}$. The first audio driver A and the second audio driver B may represent any suitable pair of audio drivers such as audio drivers 1102A and 1102I of FIG. 11 or audio drivers 1204A and 1204B of FIG. 12, among many other possible examples.

The azimuthal angle θ between audio drivers A & B and the NMD may be determined by the processing device determining $r_\Phi$, the radius from the second audio driver B that represents a determined phase offset Φ [s] between the first audio driver A and the second audio driver B. $r_\Phi$ is based on the speed of sound v [m/s] in the environment, which may be measured or assumed to be a given value, such as 340 meters per second. $r_\Phi$ is as follows:

$$r_\Phi = \Phi * v$$

From $r_\Phi$, the processing device may determine $\theta_B$ as follows, where x [m] represents the distance from audio driver A to the NMD and d [m] represents the known distance between the audio drivers A and B:

$$\theta_B = \cos^{-1}\left(\frac{d^2 + r_\phi^2 + 2xr_\phi}{2d(x+r_\phi)}\right).$$

Given $\theta_B$, the processing device may determine $\theta_{\Phi,B}$ as follows:

$$\theta_{\phi,B} = \tan^{-1}\left(\cot(\theta_B) - \frac{d}{2(x+r_\phi\sin(\theta_B))}\right)$$

The processing device may determine $\theta_{\Phi,min}$, the minimum possible angle between on-axis and the NMD given the determined phase offset Φ:

$$\theta_{\phi,min} = \tan^{-1}\left(\cot(\theta_B) - \frac{d}{2(x_{max}+r_\phi\sin(\theta_B))}\right)$$

$\theta_{\Phi,min}$ may occur when $x = x_{max}$. $x_{max}$ may be set to an estimated max room size or to infinity.

If $x_{max}$ = infinity, then $\theta_{\phi,min} = \cos^{-1}\frac{r_\phi}{d}$ and $\theta_{\phi,min} = \tan^{-1}\left(\frac{r_\phi}{d\sqrt{1-\frac{r_\phi^2}{d^2}}}\right).$ The processing device may determine $\theta_{\Phi,max}$, the maximum possible angle between on-axis and the NMD given the determined phase offset Φ:

$$\theta_{\phi,max} = \tan^{-1}\left(\cot(\theta_B) - \frac{d}{2(x_{min}+r_\phi\sin(\theta_B))}\right)$$

$\theta_{\Phi,min}$ may occur when $x = x_{min}$. This may represent the nearest practical listening distance from the audio driver A (e.g., one meter).

Alternatively $\theta_{\Phi,min}$ may occur when $$r_{min} = \frac{d}{2}.$$

Then, $\theta_{\Phi,max}$ can be found as follows:

$$\theta_{B,max} = \frac{\pi}{4} - \sin^{-1}\frac{r_\phi}{d\sqrt{2}}$$

$$\sin\theta_{B,max} + \cos\theta_{B,max} - \sec\theta_{B,max} = \frac{-r_\phi}{d}$$

$\theta_{B,max}$ can be substituted into the formula for $\theta_{\Phi,B}$ above to determine $\theta_{\Phi,min}$ where $$r_{min} = \frac{d}{2}.$$

The above described example techniques yield a range of possible directions that the NMD can be located relative to any given point along the line between the two audio drivers (e.g., the center of a playback device housing the two audio drivers or the geometric center of two playback devices each housing a respective audio driver). This range represents the direction of the NMD relative to the given point. In typical use cases where the NMD is relatively close to the audio drivers (e.g., within a home), the range yielded by the determination is narrow (e.g., <10° or less).

In some cases, the processing device may further constrain the range of possible θ between the audio drivers by determining x, the distance from audio driver A to the NMD. The distance x may be determined using a variety of techniques. For instance, the processing device may compare the sound pressure level of the audio content that was measured by the NMD with a known sound pressure level (SPL) of the audio content that was measured at a known distance (e.g., one meter from the playback device). Sound pressure level decays by approximately 6 dB per doubling of distance, so distance from the audio drivers to the NMD can be interpolated from the SPL measurement. Other example techniques involve clock synchronization between the NMD and the playback device to measure time-of-flight, WiFi Received Signal Strength Indication (RSSI) or WiFi time-of-flight measurement, user input of the approximate distance, a physical measurement (e.g., via a built-in sensor, such as an infrared rangefinder), as well as other possible techniques. While a known x can constrain the range of possible θ, x need not be known to determine a useful range of possible θ (i.e., a range that constrains the possible direction of the NMD to an approximate direction).

While the above techniques may indicate θ, due to symmetry, the determined θ may indicate that the NMD is located at the angle θ to either the right or left side of the audio drivers. To determine whether the NMD is located to the left or to the right, the processing device may determine a distance between the NMD and a known position relative to the first audio driver and the second audio driver. Then the processing device may determine whether the determined distance between the NMD and the known position indicates that the NMD is closer to the first audio driver or the second audio driver (e.g., closer to audio driver A or audio driver B). Alternatively, if the audio content output of the audio drivers includes a known time offset between the output of each audio driver, then the relative magnitude of the impulse responses of each audio driver may indicate the relative positioning of the NMD. In particular, if audio driver B in FIG. 12 plays audio content first, then audio driver A plays the audio content at the known offset, and audio driver A's output is recorded with a greater sound pressure level than audio driver B, then audio driver A can be assumed to be nearer the NMD than driver B. As another example, as noted above, the output from each driver can be watermarked to enable later identification of the output of each driver in the recording. Example watermarks might include alteration of a frequency or phase component.

Where three or more audio drivers are positioned in a given azimuthal plane in a known geometric configuration (e.g., audio drivers 1102A-I of playback device 1100, respective phase offsets for each audio driver may be determined. A processing device may triangulate the position of the NMD using these phase differences.

d. Cause Playback Device(s) to Adjust Calibration

In FIG. 10, at block 1008, implementation 1008 involves causing the one or more playback devices to adjust calibration. For instance, the NMD may cause the one or more playback devices that include the two or more audio drivers to adjust calibration based on the identified direction of the NMD relative to the audio drivers of the playback device(s) in the given azimuthal plane.

In some cases, the NMD may determine the direction of the NMD relative to the audio drivers as part of a procedure to calibrate the one or more playback devices, possibly with other related playback devices. As noted above, calibration of the more playback devices may involve modifying one or more of magnitude response, frequency response, phase adjustment, or any other acoustic characteristic of the audio drivers of the playback device, either individually or in groups. Such modifications may be applied using one or more filters implemented in a DSP or as analog filters. The calibration data may include the parameters to implement the filters (e.g., as the coefficients of a bi-quad filter). Filters may be applied per audio driver or per set of two or more drivers (e.g., two or more drivers that form a sound axis or two or more of the same type of audio driver, among other examples).

The direction of the NMD relative to the audio drivers may influence a calibration. For instance, a spatial calibration may configure playback device(s) to one or more particular locations within the environment (e.g., one or more preferred listening positions, such as a favorite seating location). A spatial calibration might yield one or more filters that include time-delay and/or phase adjustment, gain adjustment, and/or any other adjustment to correct for the spatial placement of the playback device(s) relative to the one or more particular locations within the environment. During a spatial calibration, the direction of the NMD relative to the audio drivers may indicate the position of a preferred listening location. The media playback system may correlate the identified position of the NMD to the preferred listening location.

Adjusting the calibration based on the determined direction might also or alternatively involve adjusting spectral calibration. A spectral calibration may configure the playback device(s) of a media playback system across a given listening area spectrally. A spectral calibration may yield one or more filters that adjust the frequency response of the playback device(s). Such adjustment may help offset acoustic characteristics of the environment generally.

Some spectral calibration procedures contemplated herein involve the NMD moving within the environment surrounding the playback device while recording calibration audio output from the playback device. Recordings captured by the moving NMD may represent samples of the calibration audio at various locations, which may better represent the acoustic characteristics of the surrounding environment as a whole. By determining the direction of the NMD relative to the audio drivers at two or more instances during this procedure, the system may determine what distance the NMD moved relative to the playback devices during the procedure (e.g., how much did the determined direction change between the two or more instances). The system may determine whether this movement is exceeded a threshold degree of movement for the spectral calibration, so as to validate the movement that the NMD underwent while recording calibration audio output from the playback devices under calibration.

Adjusting calibration of the playback device may involve applying a particular calibration based on the direction of the NMD relative to the audio drivers. For instance, before or during media playback, the media playback system may use the disclosed techniques to identify the position of a NMD relative to the playback devices that are playing back media. Since commercially-available NMDs are often smartphones or other personal electronic devices, the system may assume that a listener is located at or near the position of the NMD, as the listener might tend to keep their device on or near their person. Once the relative direction of the NMD to the playback device(s) is determined, the playback device(s) may adjust playback relative to that position. For instance, the disclosed techniques might indicate that the NMD is located at a particular listening location and accordingly, the playback device(s) may apply a spatial calibration that calibrates the playback device(s) to that particular listening location. As another example, the disclosed techniques might indicate that one or more NMDs are not located at particular listening locations and accordingly, the playback device(s) may apply a spectral calibration that calibrates the playback device(s) to the environment more generally.

While examples involving audio drivers in a horizontal azimuthal plane have been described to illustrate example implementations, the audio drivers may be positioned in any plane (e.g., vertical, or at a some other angle to the ground or floor). For instance, referring back to FIG. 12, audio drivers 1204A and 1204B are aligned in a vertical azimuthal plane and could be used in determining a vertical height of an NMD relative to the audio drivers.

In some examples, the three-dimensional direction of an NMD relative to multiple audio drivers may be determined. Determination of the three-dimensional direction may involve three (or more audio drivers). A first and a second audio driver can be aligned in a first azimuthal plane (e.g., horizontal) while a third audio driver is aligned with one of the first audio driver or the second audio driver in a second azimuthal plane (e.g., vertical). Applying the above techniques might yield a horizontal azimuthal angle $\theta_H$ and a vertical azimuthal angle $\theta_V$. The processing device may convert these azimuthal angles to polar coordinates representing the three-dimensional polar direction of the NMD relative to the audio drivers.

IV. Example Techniques to Determine Direction of NMD

As discussed above, embodiments described herein may facilitate determining the position of a NMD relative to two or more audio drivers. FIG. 15 illustrates an example implementation 1500 by which a processing device determines the direction of a NMD relative to two or more audio drivers.

a. Receive Data Representing Recorded Audio Content

At block 1502, implementation 1500 involves receiving data representing recorded audio content. For instance, a processing device may receive, via a network interface, data representing a recorded audio content that was recorded by a NMD upon output of the audio content via a first audio driver and a second audio driver of one or more playback devices. As noted above, example processing devices include NMDs, playback devices, control devices, a computing device connected to the media playback system via a local area network, a remote computing device such as a cloud server, or any combination of the above. The audio content can be emitted and recorded as described above in connection with blocks 1002 and 1004 of implementation 1000, among other possible implementations.

b. Identify Reference Points in Recorded Audio Content

In FIG. 15, at block 1504, implementation 1500 involves identifying reference points in the recorded audio content. A processing device may identify reference points as described above in connection with block 1006 of implementation 1000. For instance, a processing device may identify, within an impulse response of the recorded audio content corresponding to a particular point-in-time, a first reference point corresponding to a particular frequency of the audio content played by a first audio driver at the particular point-in-time. The processing device may also identify a second reference point corresponding to the particular frequency of the audio content played by second audio driver at the particular point-in-time.

c. Record Calibration Audio

In FIG. 13, at block 1306, implementation 1300 involves identifying the direction for the NMD. For instance, the processing device may identify a direction of the NMD relative to a center point of the first audio driver and second audio driver in the given azimuthal plane. As described above in connection with block 1006 of implementation 1000, identifying the direction of the NMD may include determining a phase offset between the first audio driver and second audio driver and determining a range of possible azimuthal angles between the NMD and the center point. The range of possible angles may depend upon the geometric relationships constrained by the known distance between the first audio driver and second audio driver and the determined phase offset between the first audio driver and second audio driver.

d. Cause Playback Device(s) to Adjust Calibration

At block 1308, implementation 1300 involves causing the one or more playback devices to adjust calibration. For instance, the processing device may cause the one or more playback devices that include the two or more audio drivers to adjust calibration based on the identified direction of the NMD relative to the audio drivers of the playback device(s) in the given azimuthal plane. The processing device may cause adjustment of calibration in various ways, such as in the examples described in connection with block 1008 of implementation 1000.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware.

Accordingly, the examples provided are not the only way(s) to implement such systems, methods, apparatus, and/or articles of manufacture.

(Feature 1) A method comprising receiving, via a processing device, data representing a recorded audio content that was recorded by a networked microphone device (NMD) upon output of the audio content via a first audio driver and a second audio driver of one or more playback devices, wherein the first audio driver and the second audio driver are positioned at a known distance apart in a given azimuthal plane; identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by second audio driver at the particular point-in-time; identifying a direction of the NMD relative to a center point of the first audio driver and second audio driver in the given azimuthal plane, wherein identifying the direction of the NMD comprises determining a phase offset between the first audio driver and second audio driver and determining a range of possible azimuthal angles between the NMD and the center point, the range of possible angles dependent upon (i) the known distance between the first audio driver and second audio driver and (ii) the determined phase offset between the first audio driver and second audio driver; and causing the one or more playback devices to adjust calibration based on the identified direction of the NMD relative to the center point of the first audio driver and second audio driver in the given azimuthal plane.

(Feature 2) The method of feature 1, wherein identifying the first reference point comprises identifying, as the first reference point, a first peak value in the impulse response, and wherein identifying the second reference point comprises identifying, as the second reference point, a second peak value in the impulse response, and wherein determining the phase offset comprises determining a time difference between first reference point and the second reference point.

(Feature 3) The method of feature 2, wherein the recorded audio content comprises first audio content played via the first audio driver and second audio content played via the second audio driver, the second audio content different from the first audio content, and wherein identifying the first peak value and the second peak value in the impulse response comprises: duplicating the recorded audio content to form a first recording and a second recording; filtering, from the first recording, a magnitude component of an impulse response of the second audio content; filtering, from the second recording, a magnitude component of an impulse response of the first audio content; identifying the first peak value in an impulse response of the filtered first recording, the first peak value corresponding to the particular frequency of the audio content played by the first audio driver at the particular point-in-time; and identifying the second peak value in an impulse response of the filtered second recording, the second peak value corresponding to the particular frequency of the audio content played by the second audio driver at the particular point-in-time.

(Feature 4) The method of feature 2, wherein determining the time difference between first reference point and the second reference point comprises subtracting a phase coordinate of the first peak value from a phase coordinate of the second peak value.

(Feature 5) The method of feature 1, wherein the method further comprises determining that the phase offset between the first audio driver and second audio driver is outside of a calibration range, wherein a minimum of the calibration range is zero seconds and a maximum of the of the calibration range is equivalent to the known distance divided by the speed of sound.

(Feature 6) The method of feature 1, wherein identifying the direction of the NMD relative to the center point of the first audio driver and second audio driver in the given azimuthal plane comprises determining a distance between the NMD and a known position relative to the first audio driver and the second audio driver; and determining that the determined distance between the NMD and the known position relative to the first audio driver and the second audio driver indicates that the NMD is closer to one of the first audio driver and the second audio driver.

(Feature 7) The method of feature 1, wherein the processing device comprises the NMD, and wherein the method further comprises recording the audio content upon output of the audio content via the first audio driver and the second audio driver.

(Feature 8) The method of feature 1, wherein one or more servers that are coupled to at least one of one or more playback devices via one or more networks comprise the processing device.

(Feature 9) The method of feature 1, wherein causing the one or more playback devices to adjust calibration based on the identified direction of the NMD relative to the center point of the first audio driver and second audio driver in the given azimuthal plane comprises sending an indication of the identified direction of the NMD relative to the center point of the first audio driver and second audio driver in the given azimuthal plane.

(Feature 10) The method of feature 1, wherein causing the one or more playback devices to adjust calibration based on the identified direction of the NMD relative to the center point of the first audio driver and second audio driver in the given azimuthal plane comprises causing the first audio driver and the second audio driver to form one or more sound axes oriented in the identified direction.

(Feature 11) A tangible, non-transitory computer-readable medium having stored therein instructions executable by one or more processors to cause a device to perform the method of any of features 1-10.

(Feature 12) A device configured to perform the method of any of features 1-10.

(Feature 13) A media playback system configured to perform the method of any of features 1-10.

(Feature 14) A method comprising: causing, via a network interface, a first audio driver and a second audio driver of one or more playback devices to output audio content, wherein the first audio driver and the second audio driver are positioned at a known distance apart in a given azimuthal plane; recording, via a microphone, the audio content output by the first audio driver and the second audio driver; causing a processing device to identify a direction of the NMD relative to a center point of the first audio driver and second audio driver in the given azimuthal plane, wherein identifying the direction of the NMD comprises determining a range of possible azimuthal angles between the NMD and the center point, the range of possible angles dependent upon (i) the known distance between the first audio driver and second audio driver and (ii) a phase offset between the first audio driver and second audio driver indicated by the recorded audio content output by the first audio driver and the second audio driver; and causing the one or more playback devices to adjust calibration based on the identified direction of the NMD relative to the center point of the first audio driver and second audio driver in the given azimuthal plane.

(Feature 15) The method of feature 14, wherein the NMD comprises the processing device, and wherein the method further comprises identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by second audio driver at the particular point-in-time; and determining the phase offset between the first audio driver and second audio driver, wherein determining the phase offset comprises determining a time difference between first reference point and the second reference point.

(Feature 16) The method of feature 15, wherein identifying the first reference point comprises identifying, as the first reference point, a first peak value in the impulse response, and wherein identifying the second reference point comprises identifying, as the second reference point, a second peak value in the impulse response.

(Feature 17) The method of feature 16, wherein the recorded audio content comprises first audio content played via the first audio driver and second audio content played via the second audio driver, the second audio content different from the first audio content, and wherein identifying the first peak value and the second peak value in the impulse response comprises: duplicating the recorded audio content to form a first recording and a second recording; filtering, from the first recording, a magnitude component of an impulse response of the second audio content; filtering, from the second recording, a magnitude component of an impulse response of the first audio content; identifying the first peak value in an impulse response of the filtered first recording, the first peak value corresponding to the particular frequency of the audio content played by the first audio driver at the particular point-in-time; and identifying the second peak value in an impulse response of the filtered second recording, the second peak value corresponding to the particular frequency of the audio content played by the second audio driver at the particular point-in-time.

(Feature 18) The method of feature 16, wherein determining the time difference between first reference point and the second reference point comprises subtracting a phase coordinate of the first peak value from a phase coordinate of the second peak value.

(Feature 19) The method of feature 14, the method further comprising: determining that the phase offset between the first audio driver and second audio driver is outside of a calibration range, wherein a minimum of the calibration range is zero seconds and a maximum of the of the calibration range is equivalent to the known distance divided by the speed of sound; and responsively, sending an error message indicating that the NMD is improperly positioned for calibration of the one or more playback devices.

(Feature 20) The method of feature 14, wherein identifying the direction of the NMD relative to the center point of the first audio driver and second audio driver in the given azimuthal plane comprises: determining a distance between the NMD and a known position relative to the first audio driver and the second audio driver; and determining that the determined distance between the NMD and the known position relative to the first audio driver and the second audio driver indicates that the NMD is closer to one of the first audio driver and the second audio driver.

(Feature 21) The method of feature 14, wherein the method further comprises detecting a trigger condition that initiates calibration of the one or more playback devices, wherein calibration of the one or more playback devices comprises causing the first audio driver and the second audio driver to output the audio content.

(Feature 22) The method of feature 14, wherein the method further comprises: detecting, via one or more sensors, movement of the NMD; and responsively, recording the audio content output by the first audio driver and the second audio driver.

(Feature 23) A tangible, non-transitory computer-readable medium having stored therein instructions executable by one or more processors to cause a device to perform the method of any of features 14-22.

(Feature 24) A device configured to perform the method of any of features 14-22.

(Feature 25) A media playback system configured to perform the method of any of features 14-22.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method comprising:
receiving, via a processing device, data representing a recorded audio content that was recorded by a networked microphone device (NMD) upon output of the audio content via a first audio driver and a second audio driver of one or more playback devices, wherein the first audio driver and the second audio driver are positioned at a known distance apart in a given azimuthal plane;
identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by the second audio driver at the particular point-in-time;
identifying a direction of the NMD relative to a center point of the first audio driver and the second audio driver in the given azimuthal plane, wherein identifying the direction of the NMD comprises determining a phase offset between the first audio driver and the second audio driver and determining a range of possible azimuthal angles between the NMD and the center point, the range of possible angles dependent upon (i) the known distance between the first audio driver and the second audio driver and (ii) the determined phase offset between the first audio driver and the second audio driver; and causing the one or more playback devices to adjust calibration based on the identified direction of the NMD relative to the center point of the first audio driver and the second audio driver in the given azimuthal plane.

2. The method of claim 1, wherein identifying the first reference point comprises identifying, as the first reference point, a first peak value in the impulse response, and wherein identifying the second reference point comprises identifying, as the second reference point, a second peak value in the impulse response, and wherein determining the phase offset comprises determining a time difference between the first reference point and the second reference point.

3. The method of claim 2, wherein the recorded audio content comprises first audio content played via the first audio driver and second audio content played via the second audio driver, the second audio content different from the first audio content, and wherein identifying the first peak value and the second peak value in the impulse response comprises:
  duplicating the recorded audio content to form a first recording and a second recording;
  filtering, from the first recording, a magnitude component of an impulse response of the second audio content;
  filtering, from the second recording, a magnitude component of an impulse response of the first audio content;
  identifying the first peak value in an impulse response of the filtered first recording, the first peak value corresponding to the particular frequency of the audio content played by the first audio driver at the particular point-in-time; and
  identifying the second peak value in an impulse response of the filtered second recording, the second peak value corresponding to the particular frequency of the audio content played by the second audio driver at the particular point-in-time.

4. The method of claim 2, wherein determining the time difference between first reference point and the second reference point comprises subtracting a phase coordinate of the first peak value from a phase coordinate of the second peak value.

5. The method of claim 1, further comprising:
  determining that the phase offset between the first audio driver and the second audio driver is outside of a calibration range, wherein a minimum of the calibration range is zero seconds and a maximum of the calibration range is equivalent to the known distance divided by the speed of sound; and
  responsively, sending an error message indicating that the NMD is improperly positioned for calibration of the one or more playback devices.

6. The method of claim 1, wherein identifying the direction of the NMD relative to the center point of the first audio driver and the second audio driver in the given azimuthal plane comprises:
  determining a distance between the NMD and a known position relative to the first audio driver and the second audio driver; and
  determining that the determined distance between the NMD and the known position relative to the first audio driver and the second audio driver indicates that the NMD is closer to one of the first audio driver and the second audio driver.

7. The method of claim 1, wherein the processing device comprises the NMD, and wherein the method further comprises recording the audio content upon output of the audio content via the first audio driver and the second audio driver.

8. The method of claim 1, wherein one or more servers that are coupled to at least one of one or more playback devices via one or more networks comprise the processing device.

9. The method of claim 1, wherein causing the one or more playback devices to adjust calibration based on the identified direction of the NMD relative to the center point of the first audio driver and the second audio driver in the given azimuthal plane comprises sending an indication of the identified direction of the NMD relative to the center point of the first audio driver and the second audio driver in the given azimuthal plane.

10. The method of claim 1, wherein causing the one or more playback devices to adjust calibration based on the identified direction of the NMD relative to the center point of the first audio driver and the second audio driver in the given azimuthal plane comprises causing the first audio driver and the second audio driver to form one or more sound axes oriented in the identified direction.

11. A tangible, non-transitory computer-readable medium having stored therein instructions executable by one or more processors to cause a networked microphone device (NMD) to perform a method comprising:
  causing, via a network interface, a first audio driver and a second audio driver of one or more playback devices to output audio content, wherein the first audio driver and the second audio driver are positioned at a known distance apart in a given azimuthal plane;
  recording, via a microphone, the audio content output by the first audio driver and the second audio driver;
  causing a processing device to identify a direction of the NMD relative to a center point of the first audio driver and the second audio driver in the given azimuthal plane, wherein identifying the direction of the NMD comprises determining a range of possible azimuthal angles between the NMD and the center point, the range of possible angles dependent upon (i) the known distance between the first audio driver and the second audio driver and (ii) a phase offset between the first audio driver and the second audio driver indicated by the recorded audio content output by the first audio driver and the second audio driver; and
  causing the one or more playback devices to adjust calibration based on the identified direction of the NMD relative to the center point of the first audio driver and the second audio driver in the given azimuthal plane.

12. The tangible, non-transitory computer-readable medium of claim 11, wherein the NMD comprises the processing device, and wherein the method further comprises:
  identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by the second audio driver at the particular point-in-time; and determining the phase offset between the first audio driver and the second audio driver, wherein determining the phase offset comprises determining a time difference between the first reference point and the second reference point.

13. The tangible, non-transitory computer-readable medium of claim 12, wherein identifying the first reference point comprises identifying, as the first reference point, a first peak value in the impulse response, and wherein identifying the second reference point comprises identifying, as the second reference point, a second peak value in the impulse response.

14. The tangible, non-transitory computer-readable medium of claim 13, wherein the recorded audio content comprises first audio content played via the first audio driver and second audio content played via the second audio driver, the second audio content different from the first audio content, and wherein identifying the first peak value and the second peak value in the impulse response comprises:
  duplicating the recorded audio content to form a first recording and a second recording;
  filtering, from the first recording, a magnitude component of an impulse response of the second audio content;
  filtering, from the second recording, a magnitude component of an impulse response of the first audio content;
  identifying the first peak value in an impulse response of the filtered first recording, the first peak value corresponding to the particular frequency of the audio content played by the first audio driver at the particular point-in-time; and
  identifying the second peak value in an impulse response of the filtered second recording, the second peak value corresponding to the particular frequency of the audio content played by the second audio driver at the particular point-in-time.

15. The tangible, non-transitory computer-readable medium of claim 13, wherein determining the time difference between the first reference point and the second reference point comprises subtracting a phase coordinate of the first peak value from a phase coordinate of the second peak value.

16. The tangible, non-transitory computer-readable medium of claim 11, the method further comprising:
  determining that the phase offset between the first audio driver and the second audio driver is outside of a calibration range, wherein a minimum of the calibration range is zero seconds and a maximum of the calibration range is equivalent to the known distance divided by the speed of sound; and
  responsively, sending an error message indicating that the NMD is improperly positioned for calibration of the one or more playback devices.

17. The tangible, non-transitory computer-readable medium of claim 11, wherein identifying the direction of the NMD relative to the center point of the first audio driver and the second audio driver in the given azimuthal plane comprises:
  determining a distance between the NMD and a known position relative to the first audio driver and the second audio driver; and
  determining that the determined distance between the NMD and the known position relative to the first audio driver and the second audio driver indicates that the NMD is closer to one of the first audio driver and the second audio driver.

18. The tangible, non-transitory computer-readable medium of claim 11, wherein the method further comprises:
  detecting a trigger condition that initiates calibration of the one or more playback devices, wherein calibration of the one or more playback devices comprises causing the first audio driver and the second audio driver to output the audio content.

19. The tangible, non-transitory computer-readable medium of claim 11, wherein the method further comprises:
  detecting, via one or more sensors, movement of the NMD; and
  responsively, recording the audio content output by the first audio driver and the second audio driver.

20. A media playback system comprising:
  a playback device comprising a first audio driver and a second audio driver that are positioned at a known distance apart in a given azimuthal plane;
  a networked microphone device (NMD) comprising a microphone, the networked microphone device connected to the playback device via one or more networks;
  a processor; and
  a computer-readable medium having stored therein instructions executable by one or more processors to cause the media playback system to perform a method comprising:
  causing the first audio driver and the second audio driver to output audio content, recording, via the microphone, the audio content output by the first audio driver and the second audio driver;
  identifying, within an impulse response of the recorded audio content corresponding to a particular point-in-time, (i) a first reference point corresponding to a particular frequency of the audio content played by the first audio driver at the particular point-in-time and (ii) a second reference point corresponding to the particular frequency of the audio content played by the second audio driver at the particular point-in-time;
  determining a phase offset between the first audio driver and the second audio driver;
  identifying a direction of the NMD relative to a center point of the first audio driver and the second audio driver in the given azimuthal plane, wherein identifying the direction of the NMD comprises determining a range of possible azimuthal angles between the NMD and the center point, the range of possible angles dependent upon (i) the known distance between the first audio driver and the second audio driver and (ii) the determined phase offset between the first audio driver and the second audio driver; and
  causing the playback device to adjust calibration based on the identified direction of the NMD relative to the center point of the first audio driver and the second audio driver in the given azimuthal plane.

* * * * *